(12) United States Patent
Ono et al.

(10) Patent No.: US 11,754,993 B2
(45) Date of Patent: Sep. 12, 2023

(54) MACHINE TOOL, CONTROL METHOD FOR MACHINE TOOL, AND CONTROL PROGRAM FOR MACHINE TOOL

(71) Applicant: DMG MORI CO., LTD., Nara (JP)

(72) Inventors: Masahiro Ono, Yamatokoriyama (JP); Tsunehito Nakahigashi, Yamatokoriyama (JP); Yuta Noro, Yamatokoriyama (JP); Fumikazu Kondo, Yamatokoriyama (JP)

(73) Assignee: DMG MORI CO., LTD., Nara (JP)

( * ) Notice: Subject to any disclaimer, the term of this patent is extended or adjusted under 35 U.S.C. 154(b) by 79 days.

(21) Appl. No.: 17/621,215

(22) PCT Filed: Jun. 16, 2020

(86) PCT No.: PCT/JP2020/023508
§ 371 (c)(1),
(2) Date: Dec. 20, 2021

(87) PCT Pub. No.: WO2020/255941
PCT Pub. Date: Dec. 24, 2020

(65) Prior Publication Data
US 2022/0236715 A1     Jul. 28, 2022

(30) Foreign Application Priority Data

Jun. 21, 2019   (JP) .................................. 2019-115545
Oct. 2, 2019    (JP) .................................. 2019-182107

(51) Int. Cl.
*G05B 19/402*      (2006.01)
(52) U.S. Cl.
CPC .. *G05B 19/402* (2013.01); *G05B 2219/37618* (2013.01)

(58) Field of Classification Search
CPC .. B23Q 11/0891; B23Q 17/00; G05B 19/402; G05B 19/409; G05B 19/42; G05B 2219/37618; G05B 2219/45242
See application file for complete search history.

(56) References Cited

U.S. PATENT DOCUMENTS

| 2006/0137136 A1* | 6/2006 | Imai | E05F 15/662 16/52 |
| 2008/0168860 A1* | 7/2008 | Nishi | B23Q 11/0891 409/134 |

(Continued)

FOREIGN PATENT DOCUMENTS

JP    2009-214214 A    9/2009

*Primary Examiner* — Kidest Bahta
(74) *Attorney, Agent, or Firm* — IP BUSINESS SOLUTIONS, LLC

(57) ABSTRACT

A machine tool includes: a cover; a door; a drive mechanism; a detection unit; and an operation panel that receives an operation for the machine tool. A control device of the machine tool performs: processing to control the drive mechanism such that the door is opened, based on the operation panel receiving a first opening operation; processing to obtain an actual position from the detection unit and store the actual position as an opening position of the door, based on the operation panel receiving an operation to determine a position; and processing to control the drive mechanism such that the door is located at the opening position, based on the operation panel receiving a second opening operation. An opening speed of the door during the first opening operation is slower than an opening speed of the door during the second opening operation.

7 Claims, 20 Drawing Sheets

(56) References Cited

U.S. PATENT DOCUMENTS

2017/0269569 A1\* 9/2017 Ogawa ................. G05B 19/416
2017/0284146 A1\* 10/2017 Maki ..................... E05F 15/632

\* cited by examiner

FIG.2
(A)
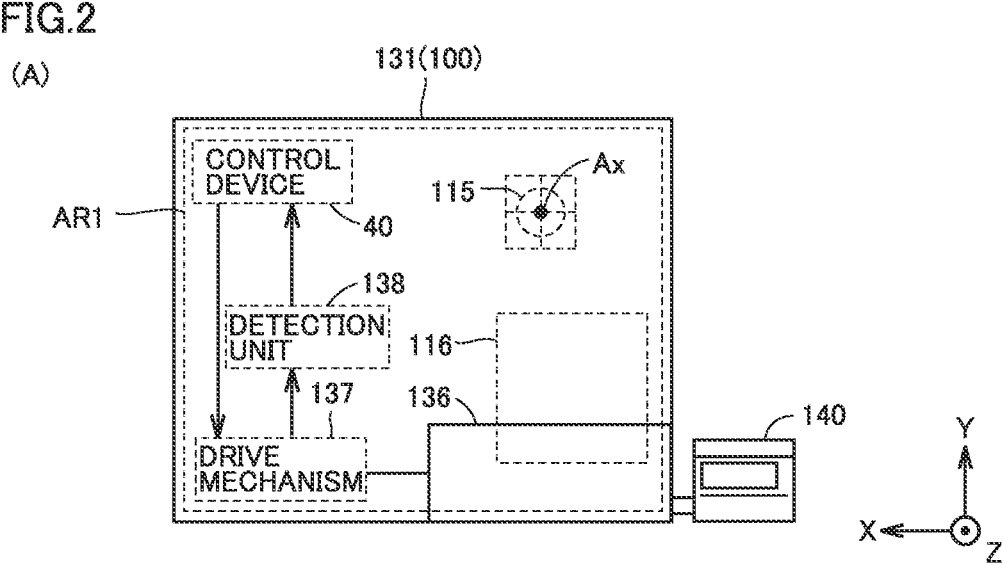
(B)
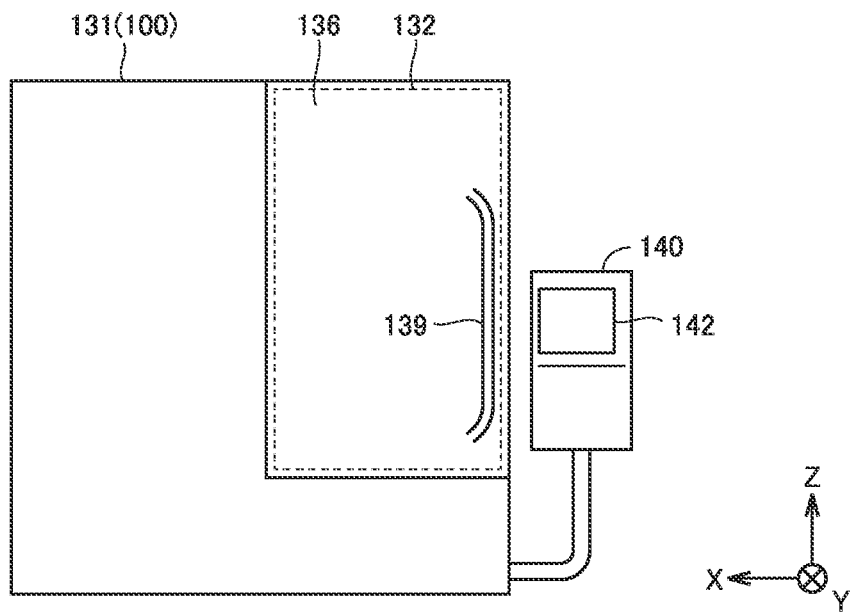

MACHINE TOOL, CONTROL METHOD FOR MACHINE TOOL, AND CONTROL PROGRAM FOR MACHINE TOOL

TECHNICAL FIELD

The present disclosure relates to a technique for controlling driving of a door provided to a machine tool.

BACKGROUND ART

Machine tools having doors are in widespread use. Such a door is closed while a workpiece is machined, and is opened while a workpiece is not machined. This prevents scattering of machining swarf and the like generated during machining.

Regarding control of driving of such a door, Japanese Patent Laying-Open No. 2009-214214 (PTL 1) discloses a machine tool intended to shorten the time taken to close a door. The machine tool drives the door to a fixed opening position when opening the door, and drives the door to a fixed closing position when closing the door.

CITATION LIST

Patent Literature

PTL 1: Japanese Patent Laying-Open No. 2009-214214

SUMMARY OF INVENTION

Technical Problem

In order to stop a door at an arbitrary position, it is generally necessary to designate an opening/closing position of the door on a program, or to change setting for the opening/closing position. However, specialized knowledge is required to designate the opening/closing position by these methods. Further, it is also difficult to intuitively understand the degree of opening/closing of the door. Therefore, there is a need for a technique capable of easily setting an opening/closing position of a door.

Solution to Problem

In an example of the present disclosure, a machine tool includes: a cover having an opening and defining a machining area for a workpiece; a door for covering the opening; a drive mechanism that drives the door to change a degree of the opening; a detection unit for detecting an actual position of the door; an operation panel for receiving an operation for the machine tool; and a control device for controlling the machine tool. The control device performs: processing to control the drive mechanism such that the door is opened, based on the operation panel receiving a first opening operation for the door; processing to obtain the actual position from the detection unit and store the obtained actual position as an opening position of the door, based on the operation panel receiving an operation to determine a position of the door; and processing to control the drive mechanism such that the door is located at the opening position, based on the operation panel receiving a second opening operation for the door. An opening speed of the door during the first opening operation is slower than an opening speed of the door during the second opening operation.

In another example of the present disclosure, a control method for a machine tool is provided. The machine tool includes: a cover having an opening and defining a machining area for a workpiece; a door for covering the opening; a drive mechanism that drives the door to change a degree of the opening; a detection unit for detecting an actual position of the door; and an operation panel for receiving an operation for the machine tool. The control method includes: controlling the drive mechanism such that the door is opened, based on the operation panel receiving a first opening operation for the door, obtaining the actual position from the detection unit and storing the obtained actual position as an opening position of the door, based on the operation panel receiving an operation to determine a position of the door, and controlling the drive mechanism such that the door is located at the opening position, based on the operation panel receiving a second opening operation for the door. An opening speed of the door during the first opening operation is slower than an opening speed of the door during the second opening operation.

In another example of the present disclosure, a control program for a machine tool is provided. The machine tool includes: a cover having an opening and defining a machining area for a workpiece; a door for covering the opening; a drive mechanism that drives the door to change a degree of the opening; a detection unit for detecting an actual position of the door; and an operation panel for receiving an operation for the machine tool. The control program causes the machine tool to perform: controlling the drive mechanism such that the door is opened, based on the operation panel receiving a first opening operation for the door, obtaining the actual position from the detection unit and storing the obtained actual position as an opening position of the door, based on the operation panel receiving an operation to determine a position of the door, and controlling the drive mechanism such that the door is located at the opening position, based on the operation panel receiving a second opening operation for the door. An opening speed of the door during the first opening operation is slower than an opening speed of the door during the second opening operation.

According to the present disclosure, a machine tool and the like capable of easily setting an opening/closing position of a door can be provided.

BRIEF DESCRIPTION OF DRAWINGS

FIG. 2 is a view illustrating the machine tool from two directions.

DESCRIPTION OF EMBODIMENTS

Figure 1:
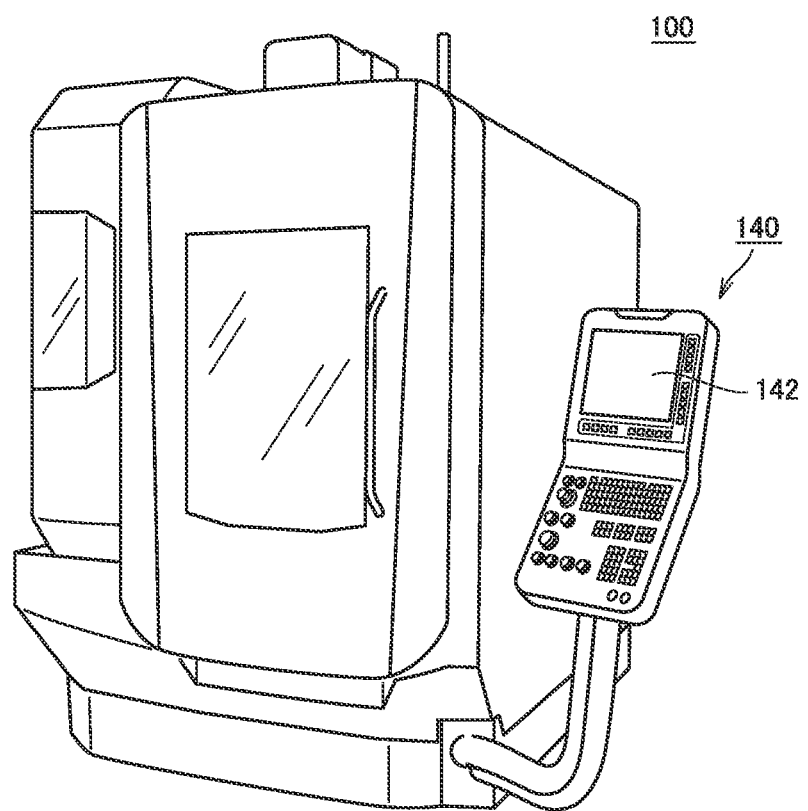
FIG. 1 is a view showing an external appearance of a machine tool.

Hereinafter, embodiments according to the present invention will be described with reference to the drawings. In the description below, identical parts and components will be designated by the same reference numerals. Since their names and functions are also the same, the detailed description thereof will not be repeated. It should be noted that the embodiments and variations described below may be selectively combined as appropriate.

<A. External Appearance of Machine Tool 100>

A machine tool 100 according to an embodiment will be described with reference to FIGS. 1 and 2. FIG. 1 is a view showing an external appearance of machine tool 100.

The "machine tool" as used in the present specification refers to a concept including various devices having a function of machining a workpiece. Although the present specification provides description by citing a vertical machining center in which a workpiece to be machined is attached to a fixed surface extending in a horizontal direction, as an example of machine tool 100, machine tool 100 is not limited to the vertical machining center. For example, machine tool 100 may be a horizontal machining center in which a workpiece to be machined is attached to a fixed surface extending in a vertical direction. Alternatively, machine tool 100 may be a lathe, or may be another cutting machine or grinding machine.

As shown in FIG. 1, machine tool 100 includes an operation panel 140. Operation panel 140 is a general-purpose computer, and has a display 142 for displaying various types of information on machining. Display 142 is a liquid crystal display, an organic EL (Electro Luminescence) display, or another display apparatus, for example. Further, display 142 is constituted by a touch panel, and receives various operations for machine tool 100 through touch operations.

<B. Door of Machine Tool 100>

FIG. 2 is a view illustrating machine tool 100 from two directions. Referring to FIG. 2, a door 136 provided to machine tool 100 will be described below.

For easier understanding, in the following, a direction in which door 136 is opened/closed will be referred to as an "X axis direction", a horizontal direction perpendicular to the X axis direction will be referred to as a "Y axis direction", and a direction perpendicular to both the X axis direction and the Y axis direction (that is, the direction of gravity) will be referred to as a "Z axis direction".

FIG. 2(A) shows machine tool 100 illustrated from the Z axis direction. FIG. 2(B) shows machine tool 100 illustrated from the Y axis direction.

As shown in FIG. 2, machine tool 100 has a control device 40, a spindle 115, a table 116, a cover 131, door 136, a drive mechanism 137, and a detection unit 138.

Spindle 115 is provided to be movable inside a machining area AR1 for a workpiece. Further, spindle 115 is provided to be movable along the Z axis direction. Further, spindle 115 is provided to be rotatable about a central axis AX parallel to the Z axis, through driving by a motor. Spindle 115 is provided with a clamp mechanism for detachably holding various tools.

Table 116 is provided to be movable inside machining area AR1. Table 116 is provided to be movable in a plane including the X axis direction and the Y axis direction (an X-Y plane). On table 116, a workpiece mounting jig (not shown) for detachably holding a workpiece is provided. A workpiece to be machined is fixed to the workpiece mounting jig through an opening 132.

Cover 131, which is also called a splash guard, forms the external appearance of machine tool 100 and defines machining area AR1. Cover 131 has opening 132. Opening 132 is provided to open from the front surface toward the upper surface of cover 131, and is in communication with machining area AR1.

Door 136 is provided to cover opening 132, and is provided to be slidable along the X axis direction. When door 136 is operated to be opened/closed, opening 132 is brought into a state where it is not covered with door 136 (an opened state), or a state where it is covered with door 136 (a closed state). When door 136 is in the closed state, door 136 defines machining area AR1 together with cover 131. Door 136 is provided with a transparent window (not shown) through which an operator can see the inside of machining area AR1. It should be noted that, although FIG. 2 shows door 136 which is slidably driven in the horizontal direction, door 136 may be slidably driven in the direction of gravity (the Z axis direction). Further, door 136 may be configured to be driven to slide on an arc.

In the following, an operation of door 136 that is performed when the opening area of opening 132 increases is referred to as an "opening operation". An operation of door 136 that slides to the negative side in the X axis direction corresponds to the "opening operation". Further, an operation of door 136 that is performed when the opening area of opening 132 decreases is referred to as a "closing operation". An operation of door 136 that slides to the positive side in the X axis direction corresponds to the "closing operation".

Drive mechanism 137 is connected to door 136. Drive mechanism 137 operates door 136 to be opened/closed to an arbitrary position in the X axis direction according to a drive command from control device 40, to change the degree of opening 132. The type of a motor included in drive mechanism 137 is not particularly limited, and is a servo motor, a stepping motor, or a linear motor, as an example.

Detection unit 138 is a sensor for detecting an actual position of door 136 based on an amount by which door 136 is driven by drive mechanism 137. The type of detection unit 138 is not particularly limited, and detection unit 138 is an encoder, for example. The actual position of door 136 detected by detection unit 138 is outputted to control device 40.

Door 136 is provided with a handle 139. When supply of power to drive mechanism 137 is stopped, a drive force does not act on door 136. On this occasion, a user can grip handle 139 and manually move door 136 in the X axis direction.

<C. Teaching Function>

Door 136 can be driven by drive mechanism 137 to an arbitrary opening/closing position in the X axis direction. In order to stop door 136 at an arbitrary position, it is generally necessary to designate an opening/closing position of door 136 on a program, or to change setting for the opening/closing position of door 136. Specialized knowledge is required to designate the opening/closing position by these methods. Further, it is also difficult to intuitively understand the degree of opening/closing of the door.

Accordingly, machine tool 100 is provided with a function by which the user can designate an opening/closing position of door 136 by manually moving door 136. Since the user can set the opening/closing position by actually moving door 136, the user can intuitively understand the opening/closing position. Further, the user does not have to rewrite a program or setting in this setting process.

Figure 3:
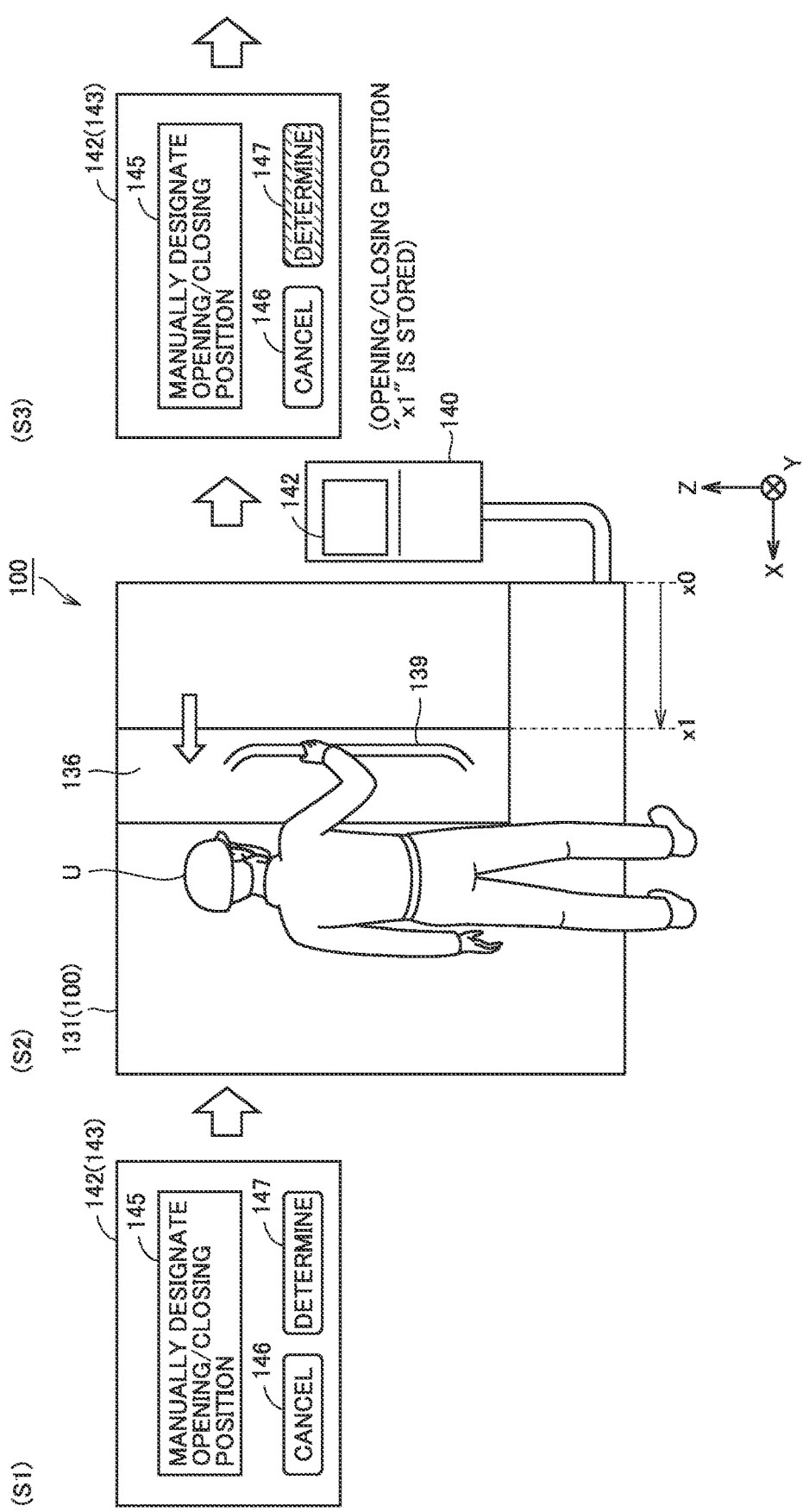
FIG. 3 is a view showing teaching processing according to an embodiment in chronological order.

In the following, a teaching function of manually setting an opening/closing position of door 136 will be described with reference to FIG. 3. FIG. 3 is a view showing teaching processing in chronological order.

It is assumed that, in step S1, a user U switches the operation mode of machine tool 100 to a teaching mode (a first mode). Based on this, control device 40 of machine tool 100 performs processing to urge user U to manually move door 136 (hereinafter also referred to as "manual request processing"). The manual request processing can be implemented by various means. As an example, the manual request processing may be implemented by displaying a message on display 142, may be implemented by outputting a voice, or may be implemented by causing a light source such as an LED (Light Emitting Diode) to emit light. In the example of FIG. 3, the manual request processing is implemented by displaying a message 145 "Manually designate opening/closing position" on a setting screen 143.

Further, while performing the manual request processing, control device 40 stops supply of power to drive mechanism 137 described above (see FIG. 2). More specifically, a power source (not shown) that supplies power is connected to drive mechanism 137. When the power is supplied from the power source to drive mechanism 137, the drive force of drive mechanism 137 acts on door 136. On the other hand, when the power is not supplied from the power source to drive mechanism 137, the drive force of drive mechanism 137 does not act on door 136. While performing the manual request processing, control device 40 stops supply of the power from the power source. Thereby, the drive force does not act on door 136, and user U can manually move door 136.

In step S2, user U grips handle 139 and moves door 136, and stops door 136 at an arbitrary position in the X axis direction. In the example of FIG. 3, user U moves door 136 from an opening/closing position "x0", and stops door 136 at an opening/closing position "x1".

It is assumed that, in step S3, control device 40 receives an order to determine the position of door 136 from user U, while performing the manual request processing. The order to determine the position can be inputted by various methods. For example, the order to determine the position may be inputted by user U pressing a specific button, or may be inputted by user U outputting a predetermined voice. The specific button may be a button of software displayed on display 142, or may be a button of hardware provided to machine tool 100.

As an example, the order to determine the position is given by user U pressing a "determine" button 147 displayed on setting screen 143. Based on this, control device 40 obtains the actual position of door 136 from detection unit 138 described above, and stores the obtained actual position as a setting position related to opening/closing of door 136. In the example of FIG. 3, a setting position "x1" is stored. The setting position "x1" may be stored in a memory within machine tool 100, or may be stored in a memory within an external device such as a server.

It should be noted that, when user U presses a "cancel" button 146 displayed on setting screen 143, control device 40 terminates the teaching mode without storing the actual position of door 136.

Figure 4:
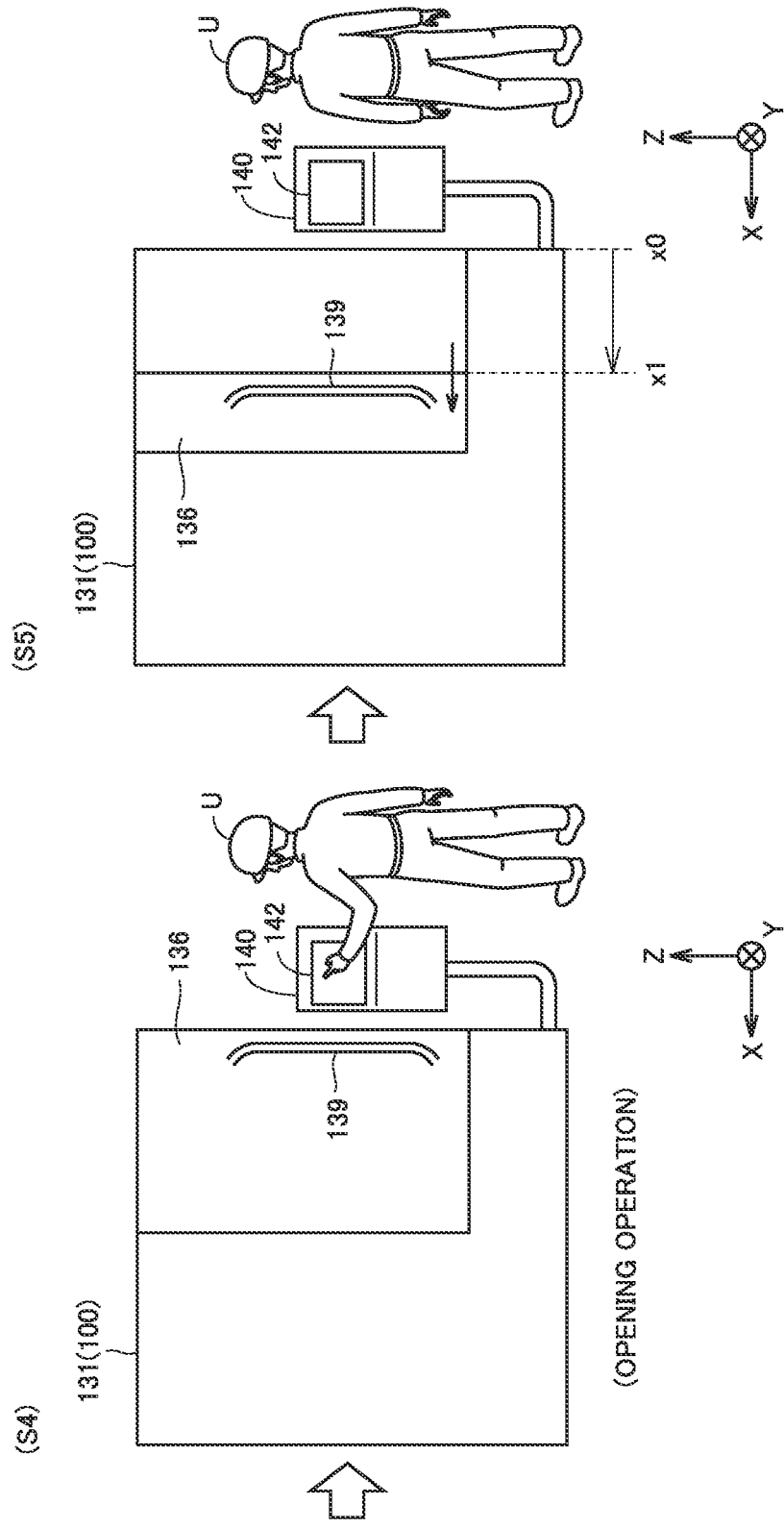
FIG. 4 is a view showing an opening operation of a door in chronological order.

Next, an operation manner of door 136 when machine tool 100 receives an operation to open door 136 from user U will be described with reference to FIG. 4. FIG. 4 is a view showing an opening operation of door 136 in chronological order.

It is assumed that, in step S4, user U switches the operation mode of machine tool 100 to an automatic opening/closing mode (a second mode), and performs an operation to open door 136 on operation panel 140. Based on this, in step S5, control device 40 of machine tool 100 controls drive mechanism 137 to drive door 136 to the setting position "x1" stored in step S3.

As described above, machine tool 100 has the teaching function by which an opening/closing position of door 136 can be manually designated. Since the user can set the opening/closing position by actually moving door 136, the user can set the opening/closing position while visually checking the degree of opening/closing. Further, since the user can set the opening/closing position merely by moving door 136, the user does not have to rewrite a program or opening/closing setting, and can easily set the opening/closing position of door 136.

It should be noted that the teaching function as described above does not exclude a function of changing the opening/closing position by rewriting a program or opening/closing setting. That is, machine tool 100 may have a function of changing the opening/closing position of door 136 according to a change in a program or opening/closing setting, in addition to the teaching function described above.

Further, although the processing to urge user U to manually move door 136 (that is, the manual request processing) is performed in step S1 of FIG. 3 in the teaching processing described above, the manual request processing does not necessarily have to be performed. In this case, machine tool 100 receives an order to determine the position of door 136 at arbitrary timing. As an example, the user manually or automatically moves door 136 to an arbitrary position to change the degree of the opening, and machine tool 100 receives an order to determine the position of door 136 during an operation in which the user moves door 136. Based on this, machine tool 100 obtains the actual position of door 136 from detection unit 138 described above, and stores the obtained actual position as an opening position of door 136 to which the opening is opened. The "opening position" means an opening/closing position of door 136 when an order to open door 136 is received from the user. Based on receiving the order to open door 136 (for example, an operation to open door 136 performed on operation panel 140) in the automatic opening/closing mode, machine tool 100 controls drive mechanism 137 such that door 136 is located at the opening position stored by the teaching processing.

<D. Device Configuration of Machine Tool 100>

Figure 5:
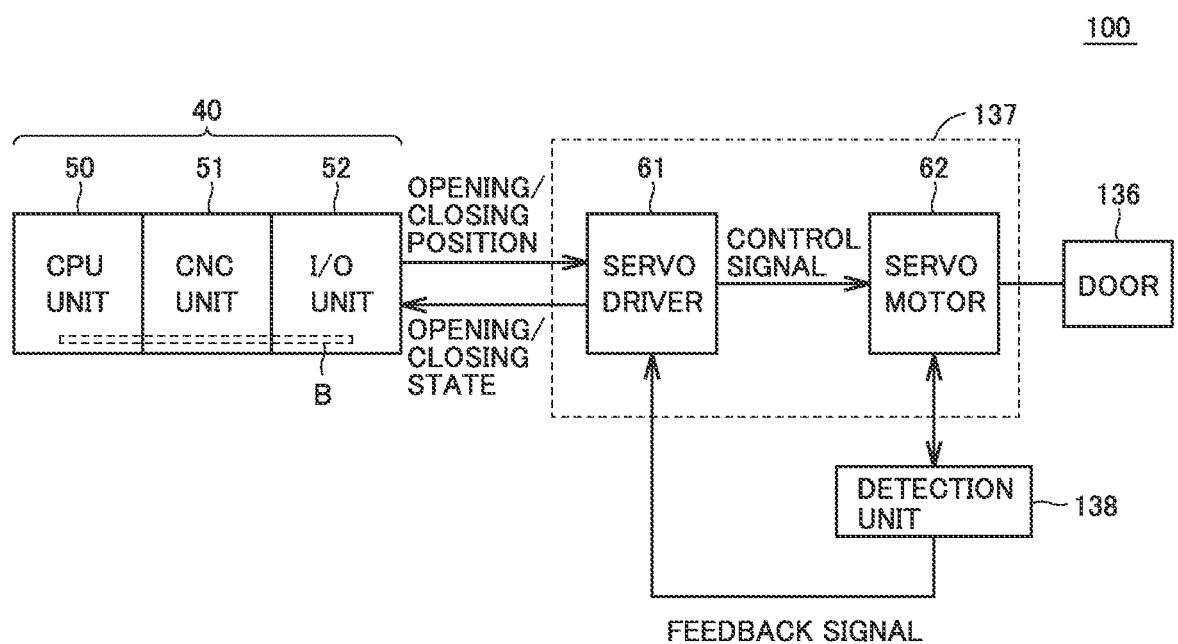
FIG. 5 is a view showing an example of a device configuration of the machine tool.

Next, a device configuration of machine tool 100 will be described with reference to FIG. 5. FIG. 5 is a view showing an example of a device configuration of machine tool 100.

Machine tool 100 includes control device 40, door 136, drive mechanism 137, and detection unit 138.

"Control device 40" as used in the present specification means a device for controlling machine tool 100. Control device 40 has an arbitrary device configuration. Control device 40 may be constituted by a single control unit, or may be constituted by a plurality of control units. In the example of FIG. 5, control device 40 is constituted by a CPU unit 50 as a PLC (Programmable Logic Controller), a CNC unit 51, and an I/O (Input Output) unit 52. These units are connected to a field bus B, and communicate with each other via field bus B.

CPU unit 50 controls various units constituting machine tool 100, according to a control program prepared beforehand. The control program is described in a ladder program, for example.

CNC unit 51 starts execution of a machining program prepared beforehand, based on receiving a command to start machining from CPU unit 50. The machining program is described in an NC (Numerical Control) program, for example. Further, CNC unit 51 outputs, to CPU unit 50, a machining progress status indicating that machining is stopped, machining is performed, machining is completed, or the like.

I/O unit 52 is an interface for connecting various input/output apparatuses. In the example of FIG. 5, drive mechanism 137 is connected to I/O unit 52. CPU unit 50 sends a control command to drive mechanism 137 via I/O unit 52.

Drive mechanism 137 includes a servo driver 61 and a servo motor 62. Servo driver 61 sequentially receives an input of a target opening/closing position from CPU unit 50, and controls servo motor 62. Servo motor 62 drives door 136 via a ball screw (not shown), and drives door 136 to an arbitrary opening/closing position in the X axis direction.

More specifically, servo driver 61 calculates an actual opening/closing position of door 136 based on a feedback signal from detection unit 138 for detecting a rotation angle of servo motor 62. Detection unit 138 is an encoder, for example. When the calculated actual opening/closing position is on a more positive side than the target opening/closing position, servo driver 61 rotationally drives servo motor 62 such that door 136 moves to the negative side. On the other hand, when the calculated actual opening/closing position is on a more negative side than the target opening/closing position, servo driver 61 rotationally drives servo motor 62 such that door 136 moves to the positive side. In this manner, servo driver 61 brings the actual opening/closing position of servo motor 62 closer to the target opening/closing position, while sequentially receiving feedback of the actual opening/closing position of servo motor 62. Thereby, servo driver 61 drives door 136 to an arbitrary position in the X axis direction.

<E. First Variation of Teaching Function>

Figure 6:
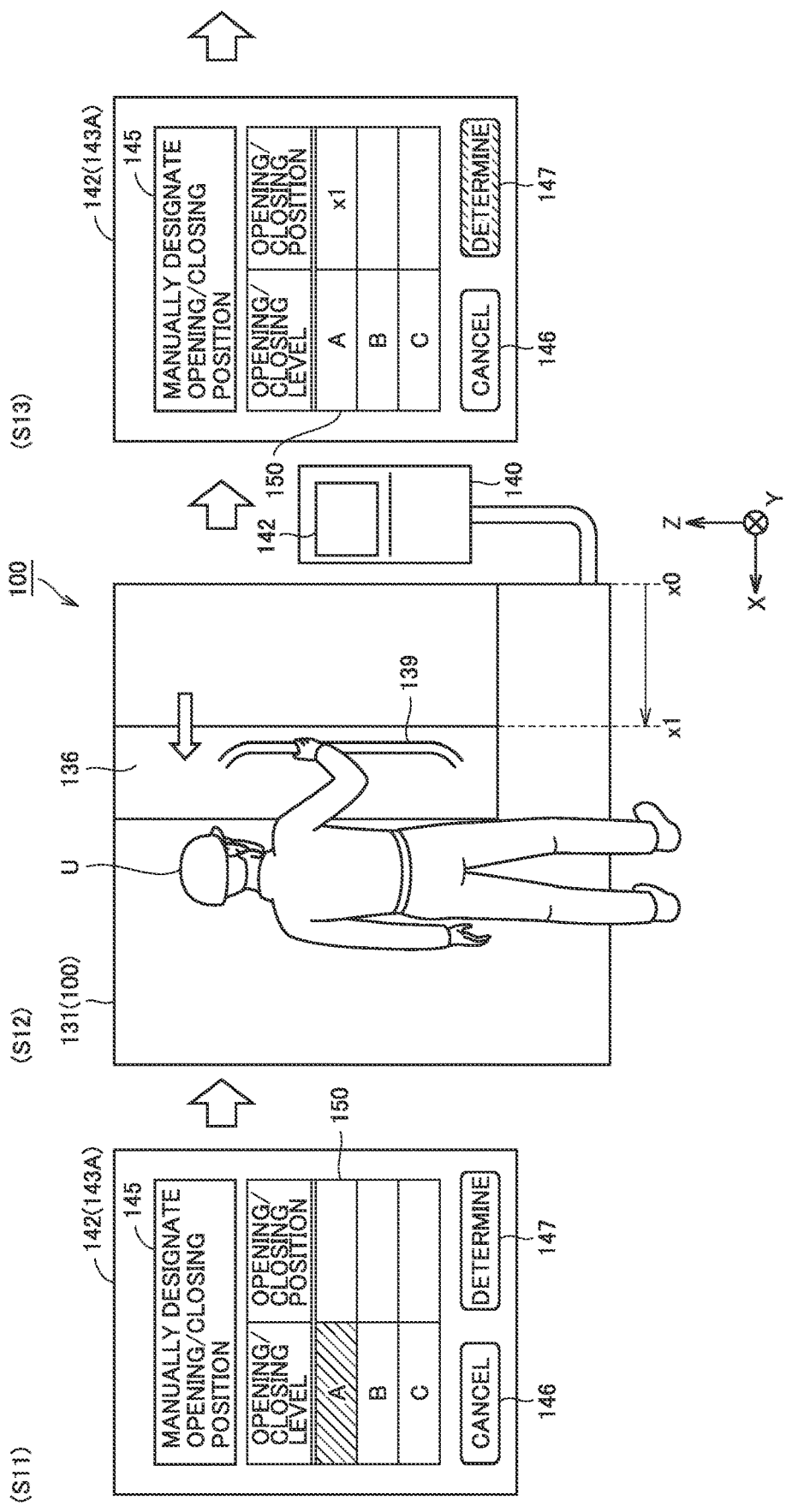
FIG. 6 is a view showing teaching processing according to a first variation in chronological order.
Figure 7:
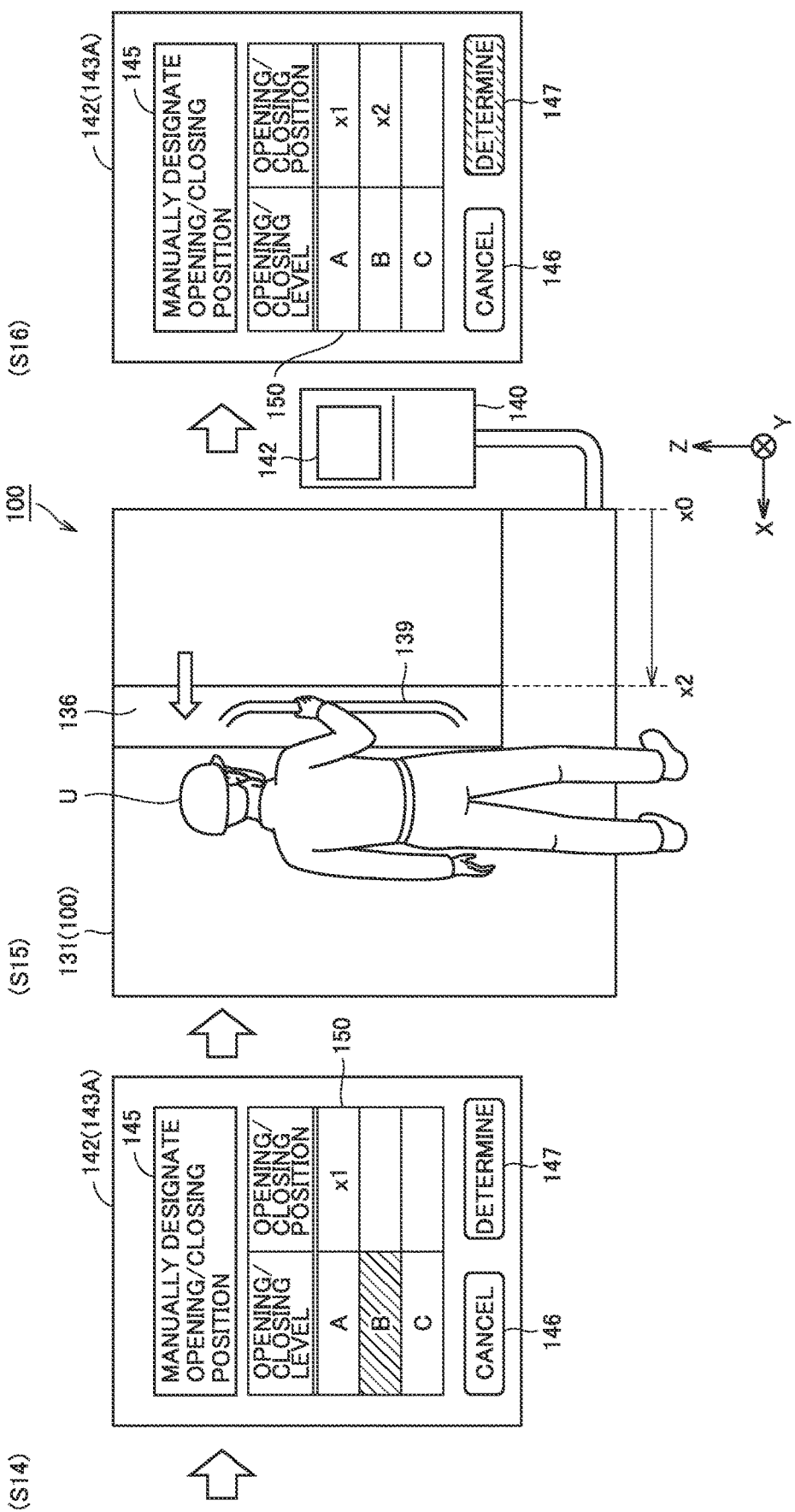
FIG. 7 is a view showing the teaching processing according to the first variation in chronological order.

Next, a first variation of the teaching function will be described with reference to FIGS. 6 to 10. FIGS. 6 and 7 are views showing teaching processing according to the first variation in chronological order.

In the teaching function shown in FIG. 3 described above, the user can designate only one opening/closing position of door 136. In contrast, in the teaching function according to the first variation, the user can set a plurality of opening/closing positions of door 136 for respective opening/closing levels.

More specifically, it is assumed that, in step S11, user U switches the operation mode of machine tool 100 to the teaching mode. Based on this, control device 40 of machine tool 100 displays a setting screen 143A for opening/closing positions on display 142.

Setting screen 143A has a setting field 150. A list of opening/closing levels which can be set is displayed in setting field 150. In the example of FIG. 6, opening/closing levels "A" to "C" are displayed in setting field 150. The names of the opening/closing levels can be arbitrarily changed by the user. The user can select an opening/closing level to be set, from the displayed opening/closing levels "A" to "C". It is assumed that, in step S11, the opening/closing level "A" is selected, for example.

In step S12, user U grips handle 139 and moves door 136, and stops door 136 at an arbitrary position in the X axis direction. In the example of FIG. 6, user U moves door 136 from the opening/closing position "x0", and stops door 136 at the opening/closing position "x1".

It is assumed that, in step S13, user U presses "determine" button 147 on setting screen 143A. Based on this, control device 40 obtains the actual position of door 136 from detection unit 138 described above (see FIG. 2). Thereafter, control device 40 stores the obtained actual position to be associated with the opening/closing level currently selected. In the example of FIG. 6, the setting position "x1" is stored to be associated with the opening/closing level "A".

Preferably, control device 40 displays the actual position of door 136 obtained from the detection unit 138, in real time, in an opening/closing position field corresponding to the selected opening/closing level "A", until "determine" button 147 is pressed. Then, after "determine" button 147 is pressed, control device 40 stops real time display of the opening/closing position, and fixedly displays the actual position of door 136 obtained from detection unit 138 at timing when "determine" button 147 is pressed.

It is assumed that, in step S14, user U selects the opening/closing level "B" in setting screen 143A. Thereby, machine tool 100 becomes ready to receive an opening/closing position for the opening/closing level "B".

In step S15, user U grips handle 139 and moves door 136, and stops door 136 at an arbitrary position in the X axis direction. In the example of FIG. 7, user U stops door 136 at an opening/closing position "x2".

It is assumed that, in step S16, user U presses "determine" button 147 on setting screen 143A. Based on this, control device 40 obtains the actual position of door 136 from detection unit 138 described above (see FIG. 2). Thereafter, control device 40 stores the obtained actual position to be associated with the opening/closing level "B" currently selected.

By repeating the processing described above, the user sequentially sets an opening/closing position for each opening/closing level. As described above, in the teaching processing of this example, control device 40 urges user U to move door 136 for each opening/closing level. In response, user U moves door 136 for each opening/closing level. Then, control device 40 sequentially receives an order to determine the position from user U, for each opening/closing level, and stores the opening/closing position designated by user U, as a setting position, for each opening/closing level.

Figure 8:
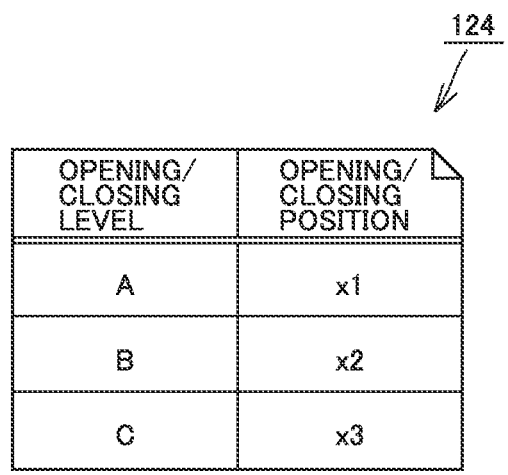
FIG. 8 is a view showing opening/closing setting stored as a result of the teaching processing according to the first variation.

FIG. 8 is a view showing opening/closing setting 124 stored as a result of the teaching processing. As shown in FIG. 8, in opening/closing setting 124, the opening/closing position set in the teaching mode is associated for each opening/closing level. Opening/closing setting 124 may be stored in a memory within machine tool 100, or may be stored in a memory within an external device such as a server.

Next, an operation manner of door 136 when user U performs an operation to open door 136 will be described with reference to FIGS. 9 and 10. It should be noted that, in the following description, it is assumed that the opening/closing positions "x1" to "x3" are set for the opening/closing levels "A" to "C", respectively, in the teaching processing described above.

Figure 9:
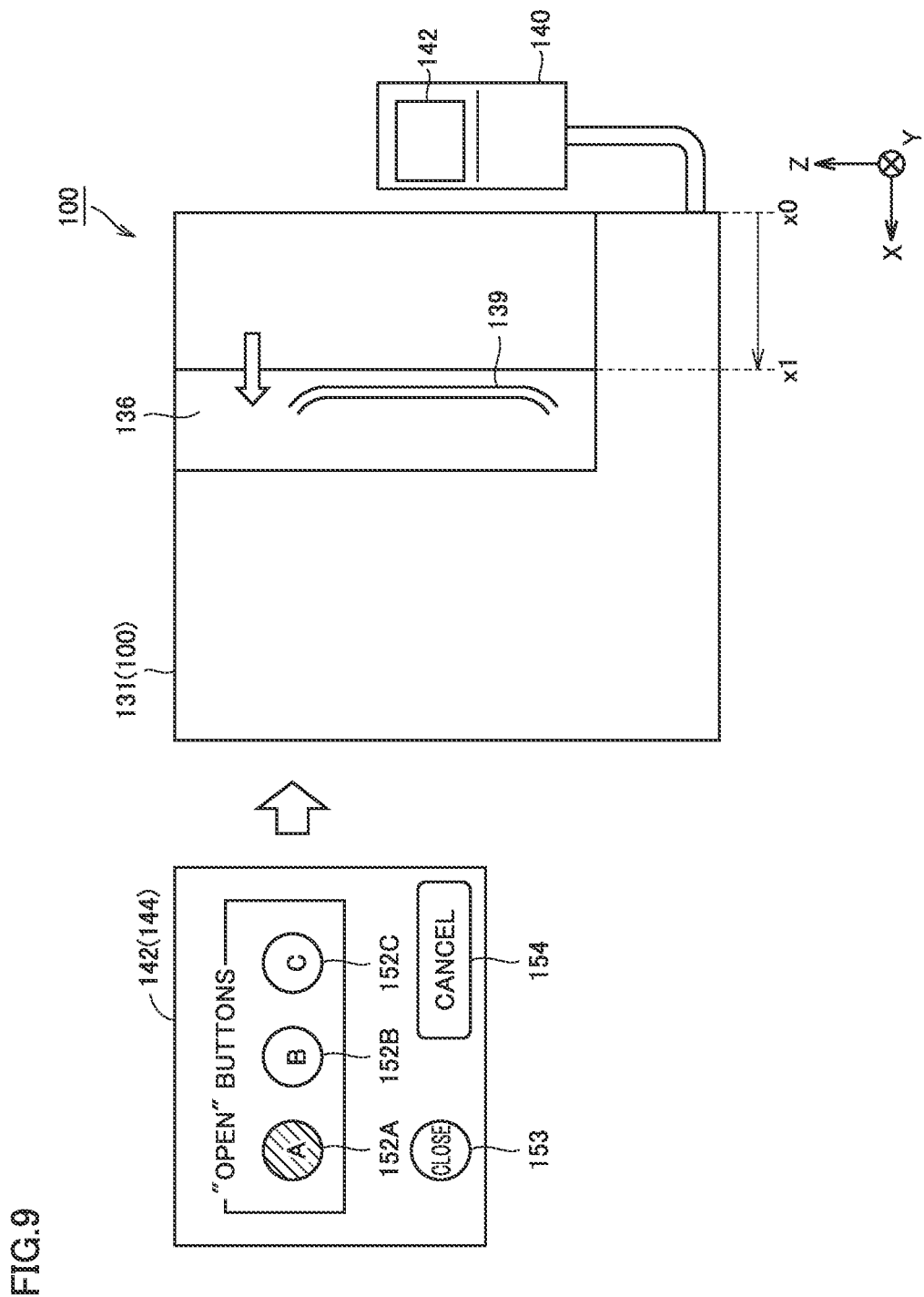
FIG. 9 is a view illustrating an operation manner of the door at an opening/closing level "A".

FIG. 9 is a view illustrating an operation manner of door 136 at the opening/closing level "A". Based on the user performing an operation to switch the operation mode of machine tool 100 to the automatic opening/closing mode on operation panel 140, control device 40 displays an opening/closing operation screen 144 on display 142. Opening/closing operation screen 144 includes "open" buttons 152A to 152C, a "close" button 153, and a "cancel" button 154, for example.

Typically, the number of the "open" buttons displayed on opening/closing operation screen 144 is the same as the number of the opening/closing levels for which the opening/closing positions are set during the teaching processing. In this example, three "open" buttons 152A to 152C are displayed on opening/closing operation screen 144, because the opening/closing positions are set for the opening/closing levels "A" to "C" in the teaching processing described above.

Typically, the names indicating "open" buttons 152A to 152C are the same as the names of the opening/closing levels displayed during the teaching processing. In the example of FIG. 9, "open" button 152A indicates the opening/closing level "A". "Open" button 152B indicates the opening/closing level "B". "Open" button 152C indicates the opening/closing level "C".

It is assumed that the user presses "open" button 152A as shown in FIG. 9. Based on this, control device 40 obtains the opening/closing position "x1" corresponding to the opening/closing level "A", by referring to opening/closing setting 124 described above (see FIG. 8). Thereafter, control device 40 controls drive mechanism 137 to drive door 136 to the opening/closing position "x1".

Figure 10:
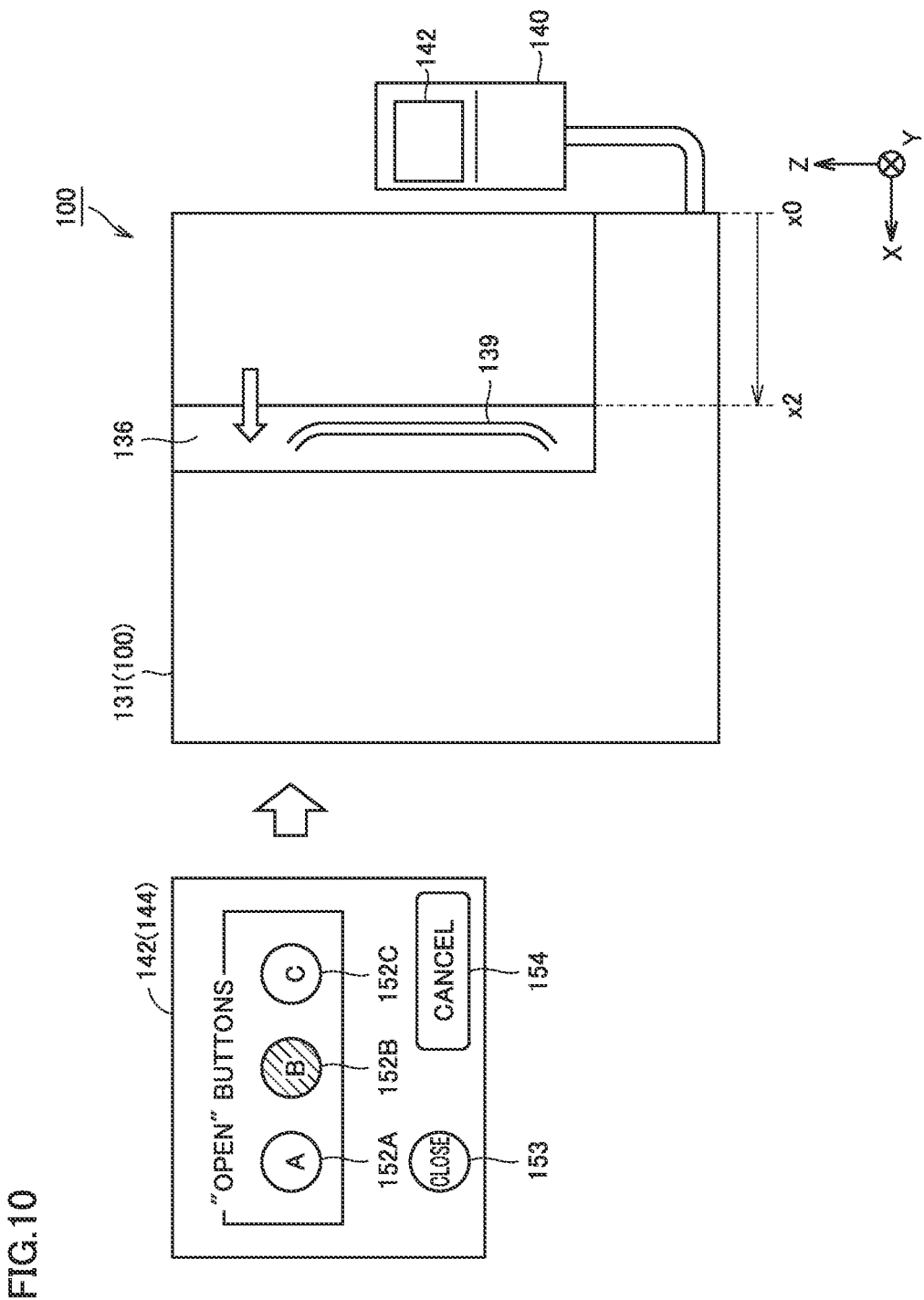
FIG. 10 is a view illustrating an operation manner of the door at an opening/closing level "B".

FIG. 10 is a view illustrating an operation manner of door 136 at the opening/closing level "B". It is assumed that the user presses "open" button 152B as shown in FIG. 10. Based on this, control device 40 obtains the opening/closing position "x2" corresponding to the opening/closing level "B", by referring to opening/closing setting 124 described above (see FIG. 8). Thereafter, control device 40 controls drive mechanism 137 to drive door 136 to the opening/closing position "x2".

It should be noted that, when the user presses "close" button 153, control device 40 controls drive mechanism 137 to close door 136. Further, when the user presses "cancel" button 154, control device 40 closes opening/closing operation screen 144, and terminates the automatic opening/closing mode.

As described above, based on receiving an input of an opening/closing level as an order for opening/closing from the user, control device 40 drives door 136 to a setting position corresponding to the inputted opening/closing level. Since the user can set an opening/closing position for each of a plurality of opening/closing levels, the user can change the degree of opening/closing to be suitable for the intended use.

<F. Second Variation of Teaching Function>

Next, a second variation of the teaching function will be described with reference to FIGS. 11 and 12.

In the teaching function according to the first variation described above, the number of the opening/closing levels for which the opening/closing positions can be set is fixed. In contrast, in the teaching function according to the present variation, the number of the opening/closing levels for which the opening/closing positions can be set can be changed arbitrarily.

Figure 11:
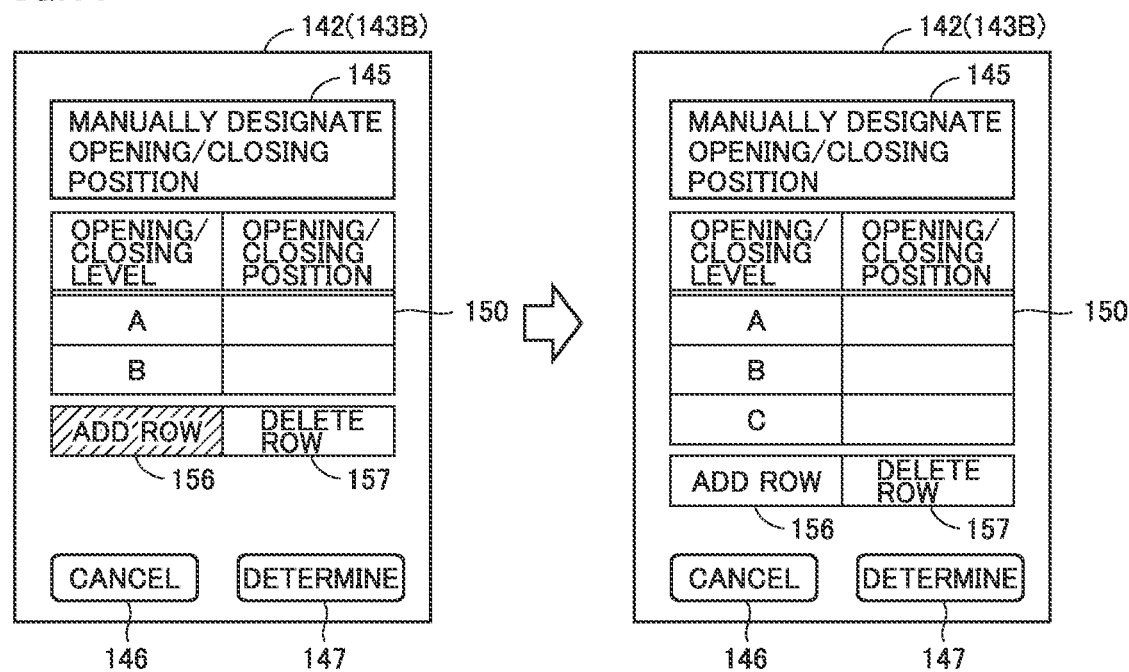
FIG. 11 is a view showing screen transition on a setting screen when opening/closing levels for which opening/closing positions can be set are increased.

FIG. 11 is a view showing screen transition on a setting screen 143B when opening/closing levels for which opening/closing positions can be set are increased. FIG. 12 is a view showing screen transition on setting screen 143B when opening/closing levels for which opening/closing positions can be set are decreased.

Figure 12:
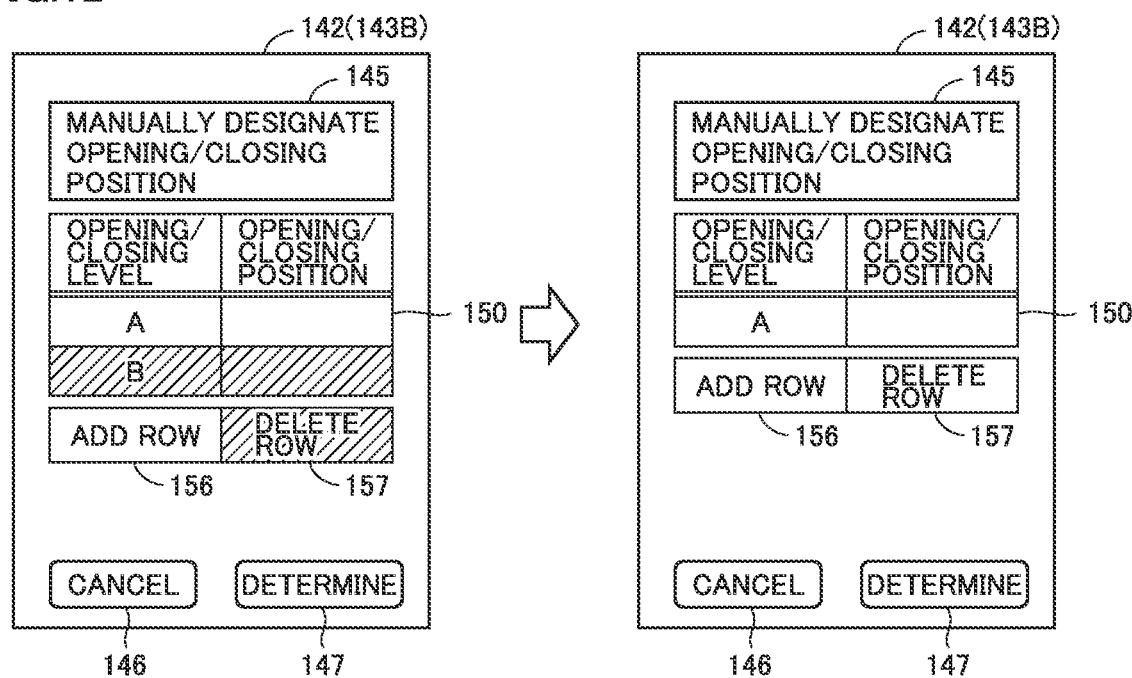
FIG. 12 is a view showing screen transition on the setting screen when opening/closing levels for which opening/closing positions can be set are decreased.

Setting screen 143B shown in FIGS. 11 and 12 includes an "add" button 156 (a first receiving portion) that receives an order to increase the number of the opening/closing levels displayed on setting screen 143B by a predetermined number, and a "delete" button 157 (a second receiving portion) that receives an order to decrease the number of the opening/closing levels displayed on setting screen 143B by the predetermined number. Except for these buttons, the components on setting screen 143B are the same as those on setting screen 143A shown in FIG. 6 described above, and thus the description thereof will not be repeated below.

As shown in FIG. 11, when the user presses "add" button 156, a row including a display field for an opening/closing level and a display field for an opening/closing position is added to setting field 150. In the example of FIG. 11, a row for the opening/closing level "C" is added.

It should be noted that the number of the opening/closing levels added by pressing "add" button 156 does not necessarily have to be one. As an example, control device 40 may increase the displayed opening/closing levels by two or more, based on "add" button 156 being pressed.

Further, means for increasing the number of the displayed opening/closing levels is not limited to "add" button 156, and display of an opening/closing level can be added by various means. As an example, increasing the number of the displayed opening/closing levels may be implemented by voice input.

As shown in FIG. 12, when the user presses "delete" button 157, a row selected within setting field 150 is deleted. In the example of FIG. 12, "delete" button 157 is pressed with a row for the opening/closing level "B" being selected, and thereby the row for the opening/closing level "B" is deleted.

It should be noted that the number of the opening/closing levels deleted by pressing "delete" button 157 does not necessarily have to be one. As an example, control device 40 may decrease the displayed opening/closing levels by two or more, based on "delete" button 157 being pressed.

Further, means for decreasing the number of the displayed opening/closing levels is not limited to "delete" button 157, and display of an opening/closing level can be deleted by various means. As an example, decreasing the number of the displayed opening/closing levels may be implemented by voice input.

By utilizing the teaching function described above, the user can set an opening/closing position of door 136 for each of the opening/closing levels displayed on setting screen 143B.

As described above, in the present variation, the user can arbitrarily change the number of the opening/closing levels for which the opening/closing positions are set. Thereby, the user can set the opening/closing positions to be suitable for various intended uses, and can change the opening/closing setting of door 136 more flexibly.

<G. Third Variation of Teaching Function>

Figure 13:
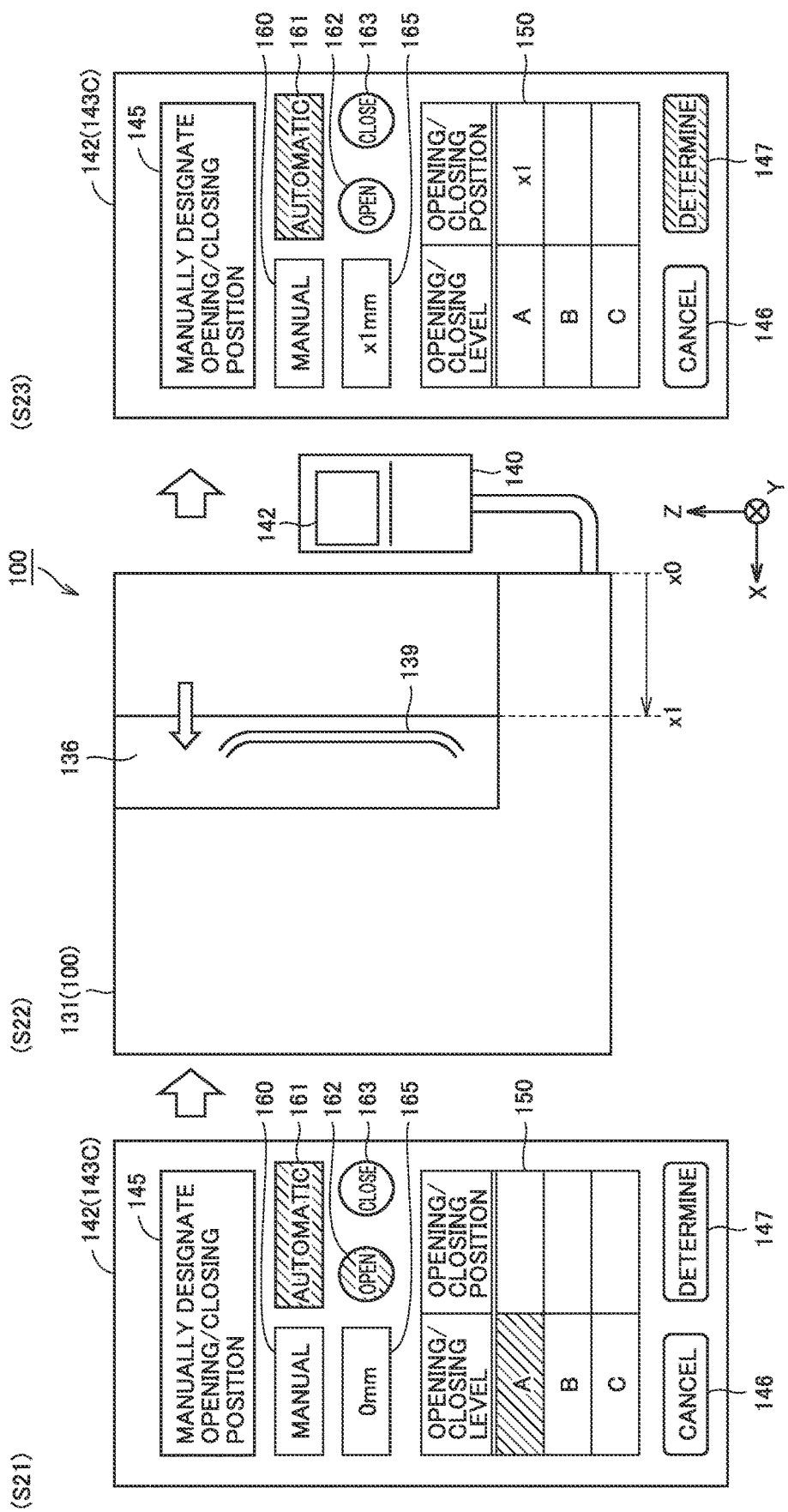
FIG. 13 is a view showing teaching processing according to a third variation in chronological order.

Next, a third variation of the teaching function will be described with reference to FIG. 13. FIG. 13 is a view showing teaching processing according to the third variation in chronological order.

In the teaching function described above, the user sets an opening/closing position by manually moving door 136. In contrast, in the teaching function according to the present variation, the user can set an opening/closing position by automatically moving door 136. Automatic driving of door 136 is implemented by drive mechanism 137 described above (see FIG. 2).

More specifically, it is assumed that, in step S21, the user switches the operation mode of machine tool 100 to the teaching mode. Based on this, control device 40 of machine tool 100 displays a setting screen 143C for opening/closing positions on display 142.

Setting screen 143C according to the present variation is different from setting screen 143A described above (see FIG. 7) in that it further has a "manual" button 160, an "automatic" button 161, an "open" button 162, a "close" button 163, and an opening/closing position display region 165. In the following, the description of the same features as those in setting screen 143A described above will not be repeated.

The teaching mode in the present variation has the manual teaching mode described above in which an opening/closing position of door 136 is manually designated, and an automatic teaching mode in which an opening/closing position of door 136 is automatically designated using drive mechanism 137. When the user presses "manual" button 160, the teaching mode is switched to the manual teaching mode. On the other hand, when the user presses "automatic" button 161, the teaching mode is switched to the automatic teaching mode.

"Manual" button 160 and "automatic" button 161 are configured such that one of them can be selected. That is, when "manual" button 160 is pressed, "manual" button 160 is in a selected state and "automatic" button 161 is in a non-selected state. On the other hand, when "automatic" button 161 is pressed, "automatic" button 161 is in a selected state and "manual" button 160 is in a non-selected state. In the example of FIG. 13, "automatic" button 161 is in the selected state, and the automatic teaching mode is selected.

Preferably, control device 40 changes the content of message 145 according to the current teaching mode. More specifically, when the current teaching mode is the manual teaching mode, control device 40 displays a message that urges the user to manually move door 136. On the other hand, when the current teaching mode is the automatic teaching mode, control device 40 displays a message that urges the user to automatically move door 136.

In the automatic teaching mode, control device 40 continues the opening operation of door 136 at a low speed while "open" button 162 is pressed, and stops the opening operation of door 136 based on entering a state where "open" button 162 is not pressed. On the other hand, control device 40 continues the closing operation of door 136 at a low speed while "close" button 163 is pressed, and stops the closing operation of door 136 based on entering a state where "close" button 163 is not pressed. In this manner, in the automatic teaching mode, the user can arbitrarily designate an opening/closing position without manually moving door 136.

Opening/closing position display region 165 displays a current opening/closing position of door 136. The opening/closing position is indicated by the degree of opening of door 136 with respect to a state where door 136 is completely closed (for example, 0 mm), for example. The unit of the opening/closing position is "mm", for example. Preferably, the opening/closing position displayed in opening/closing position display region 165 is linked to an opening/closing operation of door 136. Thereby, the user can numerically recognize the current opening/closing position in real time.

It is assumed that, in step S22, the user operates "open" button 162 and "close" button 163 to move door 136 from the opening/closing position "x0" and stop door 136 at the opening/closing position "x1".

It is assumed that, in step S23, the user presses "determine" button 147 on setting screen 143C. Based on this, control device 40 obtains the actual position of door 136 from detection unit 138 described above (see FIG. 2). Thereafter, control device 40 stores the obtained actual position to be associated with an opening/closing level currently selected. In the example of FIG. 13, the setting position "x1" is stored to be associated with the opening/closing level "A". By repeating the processing described above, the user sequentially sets an opening/closing position for each opening/closing level.

It should be noted that, although the above description has described an example where machine tool 100 includes both the manual teaching mode and the automatic teaching mode, machine tool 100 does not necessarily have to include both the manual teaching mode and the automatic teaching mode. Machine tool 100 only has to include at least one of the manual teaching mode and the automatic teaching mode.

<H. Fourth Variation of Teaching Function>

Figure 14:
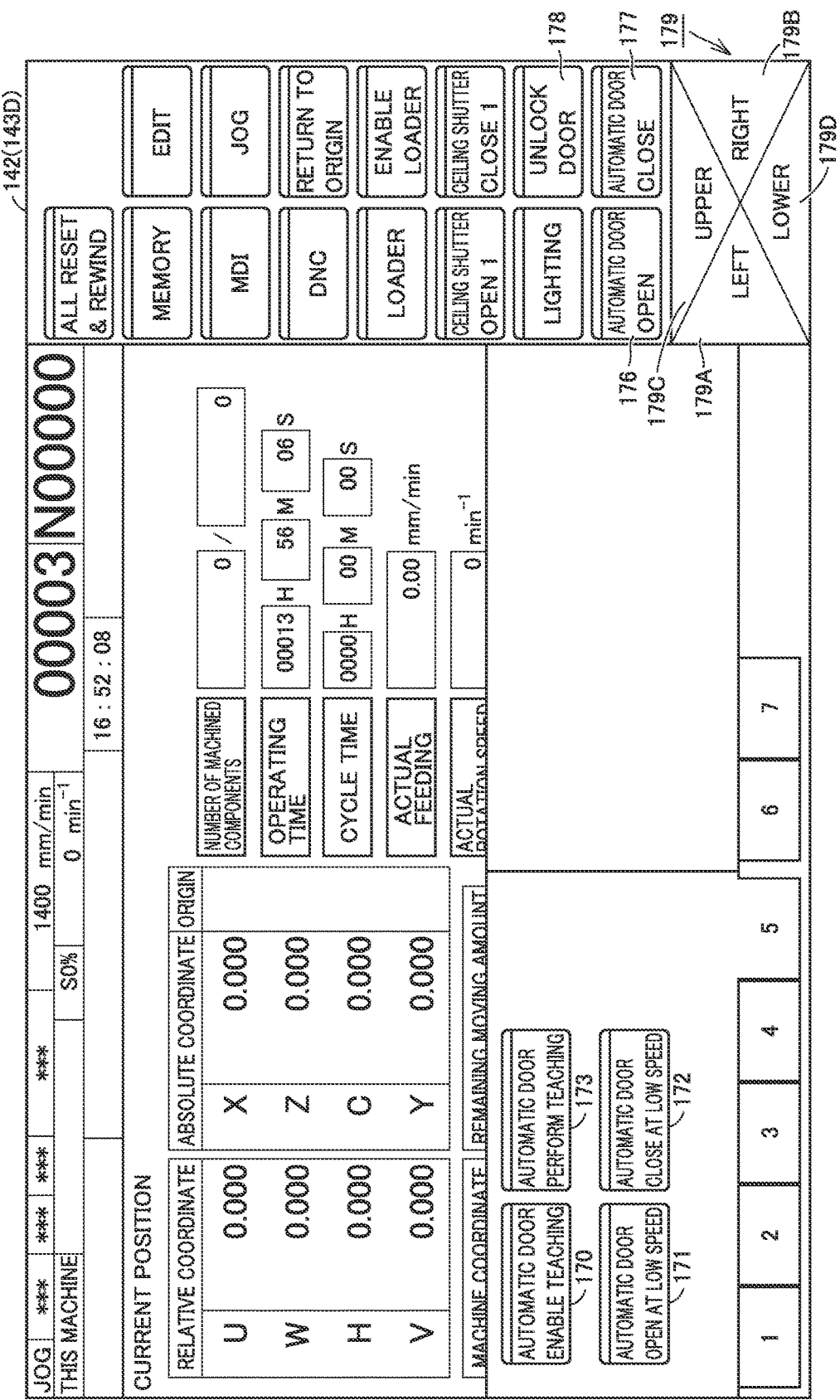
FIG. 14 is a view showing a setting screen according to a fourth variation.

Next, a fourth variation of the teaching function will be described with reference to FIG. 14. FIG. 14 is a view showing a setting screen 143D according to the fourth variation.

Setting screen 143D is displayed on display 142 of operation panel 140, for example. Through setting screen 143D, operation panel 140 receives various operations for door 136 (for example, an operation to open door 136, an operation to close door 136, an operation to determine the position of door 136, and the like).

More specifically, setting screen 143D includes an "enable teaching" button 170, an "open at low speed" button 171, a "close at low speed" button 172, a "perform teaching" button 173, an "open" button 176, a "close" button 177, an "unlock" button 178, and a "designate door" button 179.

"Enable teaching" button 170 is a button for switching between the operation modes. Each time the user presses "enable teaching" button 170, the state of "enable teaching" button 170 is alternately switched between a selected state and a non-selected state. Based on switching of "enable teaching" button 170 from the non-selected state to the selected state, machine tool 100 switches the current operation mode to the teaching mode described above. The teaching mode is an operation mode in which setting of an opening position of door 136 can be received. Based on switching of "enable teaching" button 170 from the selected state to the non-selected state, machine tool 100 switches the operation mode from the teaching mode to the automatic opening/closing mode described above. The automatic opening/closing mode is an operation mode in which door 136 can be opened to the set opening position.

Machine tool 100 may turn on a lamp (not shown) provided to machine tool 100 based on switching of "enable teaching" button 170 from the non-selected state to the selected state. Thereby, the user can easily recognize that the current operation mode is the teaching mode. Machine tool 100 turns off the lamp based on switching of "enable teaching" button 170 from the selected state to the non-selected state. Alternatively, machine tool 100 may turn off the lamp based on termination of teaching of the opening position of door 136.

Preferably, "enable teaching" button 170 is configured such that only a user having a predetermined access authority can operate it. The access authority is specified from information on login to machine tool 100, for example.

"Open at low speed" button 171 is a button for receiving an operation to open door 136 during the teaching mode (a first opening operation). When "open at low speed" button 171 is pressed, control device 40 of machine tool 100 controls drive mechanism 137 described above (see FIG. 2), and starts an opening operation of door 136. Then, control device 40 continues the opening operation of door 136 while "open at low speed" button 171 is pressed, and stops the opening operation of door 136 based on entering a state where "open at low speed" button 171 is not pressed. The opening speed of door 136 during the teaching mode is slower than the opening speed of door 136 during the automatic opening/closing mode. That is, the opening speed of door 136 using "open at low speed" button 171 is slower than the opening speed of door 136 using "open" button 176 described later.

"Close at low speed" button 172 is a button for receiving an operation to close door 136 during the teaching mode. When "close at low speed" button 172 is pressed, control device 40 of machine tool 100 controls drive mechanism 137 described above, and starts a closing operation of door 136. Then, control device 40 continues the closing operation of door 136 at a low speed while "close at low speed" button 172 is pressed, and stops the closing operation of door 136 based on entering a state where "close at low speed" button 172 is not pressed. The closing speed of door 136 during the teaching mode is slower than the closing speed of door 136 during the automatic opening/closing mode. That is, the closing speed of door 136 using "close at low speed" button 172 is slower than the closing speed of door 136 using "close" button 177 described later.

"Perform teaching" button 173 is a button for receiving an operation to determine the position of door 136. When the opening position of door 136 is adjusted using "open at low speed" button 171 and "close at low speed" button 172, and then "perform teaching" button 173 is pressed with "enable teaching" button 170 being selected, control device 40 of machine tool 100 obtains the actual position of door 136 from detection unit 138 described above (see FIG. 2). Thereafter, control device 40 stores the obtained actual position as the opening position of door 136, in opening/closing setting 124.

Preferably, "perform teaching" button 173 is configured such that only a user having a predetermined access authority can operate it. The access authority is specified from information on login to machine tool 100, for example.

"Open" button 176 is a button for receiving an operation to open door 136 during the automatic opening/closing mode (a second opening operation). When "open" button 176 is pressed, control device 40 of machine tool 100 controls drive mechanism 137 described above, and controls drive mechanism 137 described above (see FIG. 2) such that door 136 is located at the set opening position. The opening speed of door 136 using "open" button 176 is faster than the opening speed of door 136 using "open at low speed" button 171.

"Close" button 177 is a button for receiving an operation to close door 136 during the automatic opening/closing mode. When "close" button 177 is pressed, control device 40 of machine tool 100 controls drive mechanism 137 described above (see FIG. 2) such that door 136 is located at a predetermined closing position. The closing speed of door 136 using "close" button 177 is faster than the closing speed of door 136 using "close at low speed" button 172.

"Unlock" button 178 is a button for unlocking door 136. When "unlock" button 178 is pressed, machine tool 100 stops supply of power to drive mechanism 137. More specifically, when the power is supplied from the power source to drive mechanism 137, the drive force of drive mechanism 137 acts on door 136. On the other hand, when the power is not supplied from the power source to drive mechanism 137, the drive force of drive mechanism 137 does not act on door 136. Based on "unlock" button 178 being pressed, control device 40 stops supply of the power from the power source to drive mechanism 137. Thereby, the drive force does not act on door 136, and the user can manually move door 136. As a result, the user can manually perform fine adjustment of the position of door 136.

It should be noted that, although the above description has been given on the premise that machine tool 100 includes one door 136, machine tool 100 may include two or more doors 136. That is, door 136 may be constituted by right and left two doors, may be constituted by upper and lower two doors, or may be constituted by upper, lower, right, and left four doors. In this case, drive mechanism 137 (see FIG. 2) and detection unit 138 (see FIG. 2) described above are provided according to the number of doors 136, and machine tool 100 is configured to receive setting of an opening position of each door. An operation to designate door 136 as a drive target is received at "designate door" button 179, for example.

"Designate door" button 179 includes a button 179A for designating a left door, a button 179B for designating a right door, a button 179C for designating an upper door, and a button 179D for designating a lower door, for example. The user can select one of buttons 179A to 179D. When the button in the selected state is pressed again, all buttons 179A to 179D enter the non-selected state.

As an example, when button 179A is selected, the left door of machine tool 100 is selected as a drive target. As another example, when button 179B is selected, the right door of machine tool 100 is selected as a drive target. As another example, when button 179C is selected, the upper door of machine tool 100 is selected as a drive target. As another example, when button 179D is selected, the lower door of machine tool 100 is selected as a drive target.

When "open at low-speed" button 171 is pressed, control device 40 of machine tool 100 starts an opening operation of a door selected as a drive target using "designate door" button 179. Then, control device 40 continues the opening operation of the door as the drive target at a low speed while "open at low speed" button 171 is pressed, and stops the opening operation of the door based on entering the state where "open at low speed" button 171 is not pressed. Thereafter, when "perform teaching" button 173 is pressed, control device 40 obtains an actual position of door 136 as the drive target from detection unit 138 described above (see FIG. 2), and stores the actual position to be associated with identification information of the door as the drive target, in opening/closing setting 124.

When "open at low speed" button 171 is pressed with none of buttons 179A to 179D being selected, machine tool 100 operates to open all doors which can be designated as a drive target, simultaneously at a low speed.

When "close at low-speed" button 172 is pressed, control device 40 of machine tool 100 starts a closing operation of a door selected as a drive target using "designate door" button 179. Then, control device 40 continues the closing operation of the door as the drive target at a low speed while "close at low speed" button 172 is pressed, and stops the closing operation of the door based on entering the state where "close at low speed" button 172 is not pressed.

When "close at low speed" button 172 is pressed with none of buttons 179A to 179D being selected, machine tool 100 operates to close all doors which can be designated as a drive target, simultaneously at a low speed.

<I. Instruction to Open Door>

Although the above description has described an example where door 136 is driven to the opening/closing position set by the teaching processing based on the user pressing the "open" button, the opening/closing position set by the teaching processing may be referred to by an instruction code of a program. In the following, an example of such an instruction code will be described with reference to FIG. 15.

Figure 15:
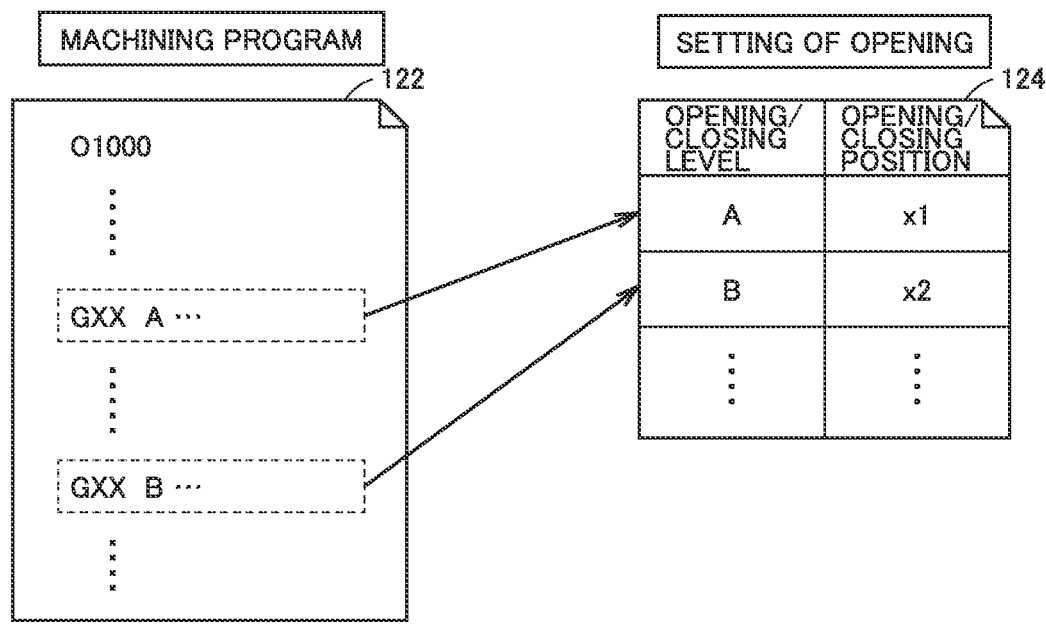
FIG. 15 is a view showing an example of a machining program.

FIG. 15 is a view showing a machining program 122 as an example. Machining program 122 includes various instruction codes related to machining of a workpiece. Machine tool 100 machines a workpiece according to machining program 122.

An opening/closing operation of the door is performed in the process of machining a workpiece. As an example, in a machining system in which a workpiece is transported by an automatic transportation device such as a robot, machine tool 100 opens door 136 before the workpiece is transported into machine tool 100 by the automatic transportation device. Then, the automatic transportation device transports the workpiece to be machined into machine tool 100. Thereafter, machine tool 100 closes door 136 and starts machining of the workpiece. When the machining is completed, door 136 is opened, and the automatic transportation device transports the machined workpiece out of machine tool 100. Thereafter, machine tool 100 closes door 136.

Such a machining process is implemented by machining program 122 shown in FIG. 15, for example. Machining program 122 is defined by the G code, for example. Machining program 122 includes an instruction code "GXX" for instructing an opening operation of door 136, where "XX" is a predetermined constant. The user can designate an opening/closing level in the instruction code "GXX".

When the instruction code "GXX" is executed, machine tool 100 specifies a level of the opening designated in the instruction code "GXX", and obtains an opening/closing position corresponding to the level of the opening by referring to opening/closing setting 124. Then, machine tool 100 drives door 136 to the obtained opening/closing position.

It should be noted that, although FIG. 15 shows an example where an instruction code for opening door 136 is defined by the G code, the instruction code does not necessarily have to be defined by the G code. As an example, the instruction code may be defined on a ladder program. In this case, the instruction code is defined in a control program 92 (see FIG. 17) on CPU unit 50 described above (see FIG. 5).

It should be noted that, although the above description has described an example where an instruction to open the door is defined by the G code, the instruction to open the door may be defined by the M code. As an example, the instruction to open the door is defined by "M85". When "M85" is executed, machine tool 100 drives door 136 to a set opening position. The opening position may be defined on machining program 122, may be defined on a ladder program (PLC program), or may be defined as a setting parameter referred to in machining program 122 or a ladder program. It should be noted that, when the current position of door 136 exceeds the designated opening position (that is, when the current opening area of door 136 is larger than an opening area obtained after door 136 is moved), machine tool 100 outputs a predetermined error code (for example, EX6042).

Further, although the above description has described an example where an instruction to open door 136 is defined by the G code or the M code, the instruction to close door 136 may be defined by the G code or the M code. As an example, the instruction to close door 136 is defined by "M86". When "M86" is executed, machine tool 100 drives door 136 to a set closing position. The closing position may be defined on machining program 122, may be defined on a ladder program (PLC program), or may be defined as a setting parameter referred to in machining program 122 or a ladder program.

<J. Function of Automatically Setting Opening/Closing Position>

Although the teaching function by which the user manually sets an opening/closing position of door 136 has been described in the example described above, the opening/closing position of door 136 may be automatically set. In the following, a function of automatically setting the opening/closing position will be described with reference to FIG. 16.

The operation mode of machine tool 100 includes a manual opening/closing mode in which door 136 is manually opened, and an automatic opening/closing mode in which door 136 is automatically opened.

When the operation mode of machine tool 100 is the manual opening/closing mode, control device 40 of machine tool 100 obtains an opening/closing position of door 136 from detection unit 138 described above (see FIG. 2) and stores the opening/closing position, each time door 136 is opened manually. As an example, the opening/closing position is stored based on not changing for a certain period of time or more.

Figure 16:
FIG. 16 is a view showing a database of opening/closing positions.

FIG. 16 is a view showing a database 96 of opening/closing positions. In database 96, each opening/closing time of door 136 is associated with an opening/closing position of door 136. Preferably, in database 96, identification information (for example, ID (Identification) or the like) of a user who has performed each opening/closing operation is further associated. The identification information of the user is specified from information on login to machine tool 100, for example.

Control device 40 automatically calculates a setting position related to opening/closing of door 136, based on the opening/closing positions stored in database 96. The setting position is more than or equal to the minimum value of the opening/closing positions stored in database 96, and is less than or equal to the maximum value of the opening/closing positions stored in database 96.

In an aspect, the setting position is an average value of the opening/closing positions stored in database 96. In another aspect, the setting position is a median value of the opening/closing positions stored in database 96. In still another aspect, the setting position is the maximum value or the minimum value of the opening/closing positions stored in database 96.

It should be noted that a plurality of the setting positions may be calculated from database 96. As an example, the setting position is calculated for each user.

When the operation mode of machine tool 100 is the automatic opening/closing mode, control device 40 controls drive mechanism 137 such that door 136 is located at the setting position described above, based on receiving an order to open door 136.

As described above, in this example, control device 40 automatically sets an optimal opening/closing position of door 136 from past operation history. Since the user only has to open/close door 136 as usual on that occasion, the user can easily set the opening/closing position of door 136 as a result.

<K. Hardware Configuration of CPU Unit 50>

Figure 17:
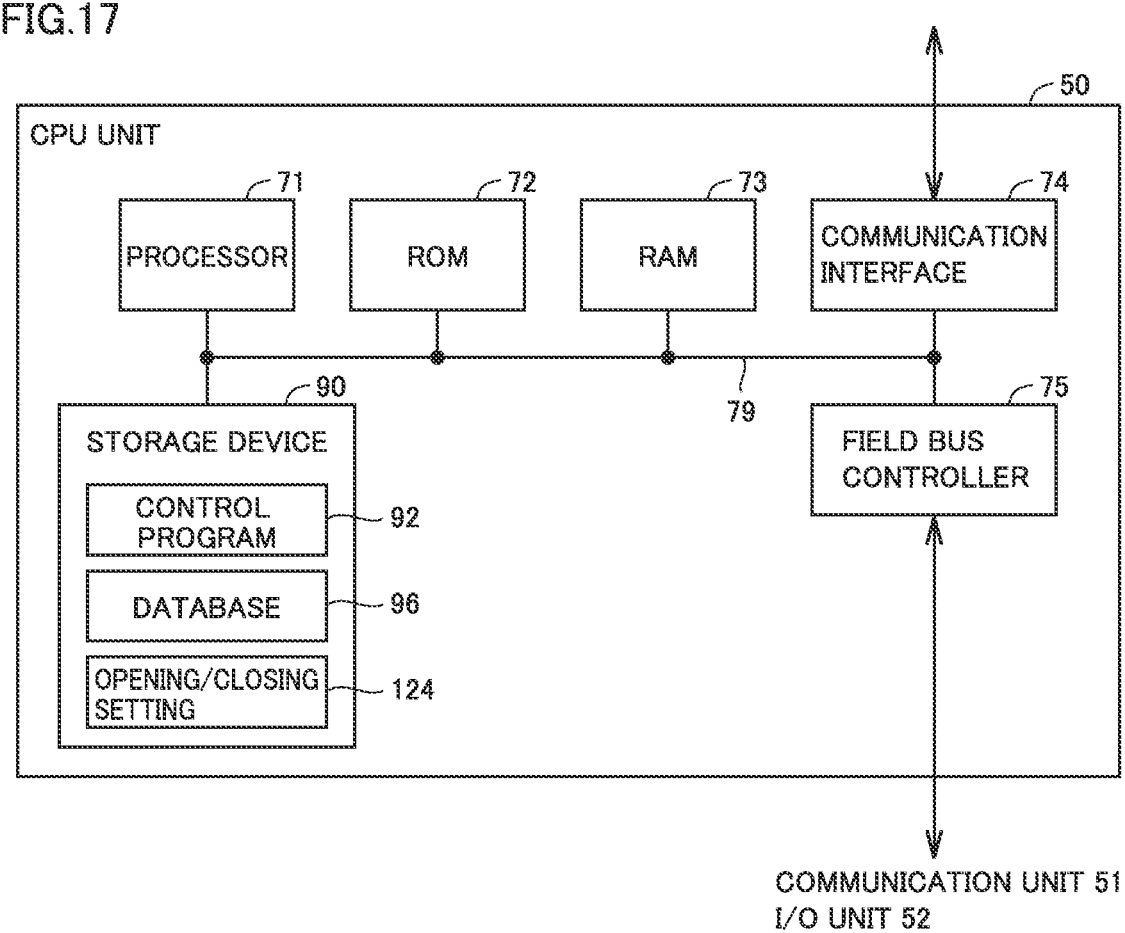
FIG. 17 is a view showing an example of a hardware configuration of a CPU (Central Processing Unit) unit.

Next, a hardware configuration of CPU unit 50 shown in FIG. 5 will be described with reference to FIG. 17. FIG. 17 is a view showing an example of a hardware configuration of CPU unit 50.

CPU unit 50 includes a processor 71, a ROM (Read Only Memory) 72, a RAM (Random Access Memory) 73, a communication interface 74, a field bus controller 75, and a storage device 90. These components are connected to an internal bus 79.

Processor 71 is constituted by at least one integrated circuit, for example. The integrated circuit can be constituted by at least one CPU, at least one GPU (Graphics Processing Unit), at least one ASIC (Application Specific Integrated Circuit), at least one FPGA (Field Programmable Gate Array), a combination thereof, or the like, for example.

Processor 71 controls an operation of CPU unit 50 by executing various programs such as control program 92. Control program 92 defines instructions for controlling various devices within machine tool 100. Processor 71 reads control program 92 from storage device 90 or ROM 72 to RAM 73, based on receiving an instruction to execute control program 92. RAM 73 functions as a working memory, and temporarily stores various types of data necessary to execute control program 92.

A LAN (Local Area Network), an antenna, and the like are connected to communication interface 74. CPU unit 50 exchanges data with an external device (for example, a server) via communication interface 74. CPU unit 50 may be configured such that it can download control program 92 from the external device.

Field bus controller 75 is an interface for implementing communication with various units connected to a field bus. Examples of the units connected to the field bus include CNC unit 51, I/O unit 52, and the like.

Storage device 90 is a storage medium such as a hard disk or a flash memory, for example. Storage device 90 stores control program 92, database 96 described above (see FIG. 16), opening/closing setting 124 described above (see FIG. 8), and the like. The location where these are stored is not limited to storage device 90, and they may be stored in a storage region (for example, a cache memory) of processor 71, ROM 72, RAM 73, an external device (for example, a server), or the like.

Control program 92 may be provided to be incorporated into a portion of an arbitrary program, rather than being provided as a single program. In this case, various types of processing according to the present embodiment are implemented in cooperation with the arbitrary program. Such a program which does not include some modules does not deviate from the gist of control program 92 according to the present embodiment. Further, the function provided by control program 92 may be partly or entirely implemented by dedicated hardware. Further, CPU unit 50 may be configured in a form like a so-called cloud service in which at least one server performs a portion of processing of control program 92.

<L. Hardware Configuration of Machine Tool 100>

Figure 18:
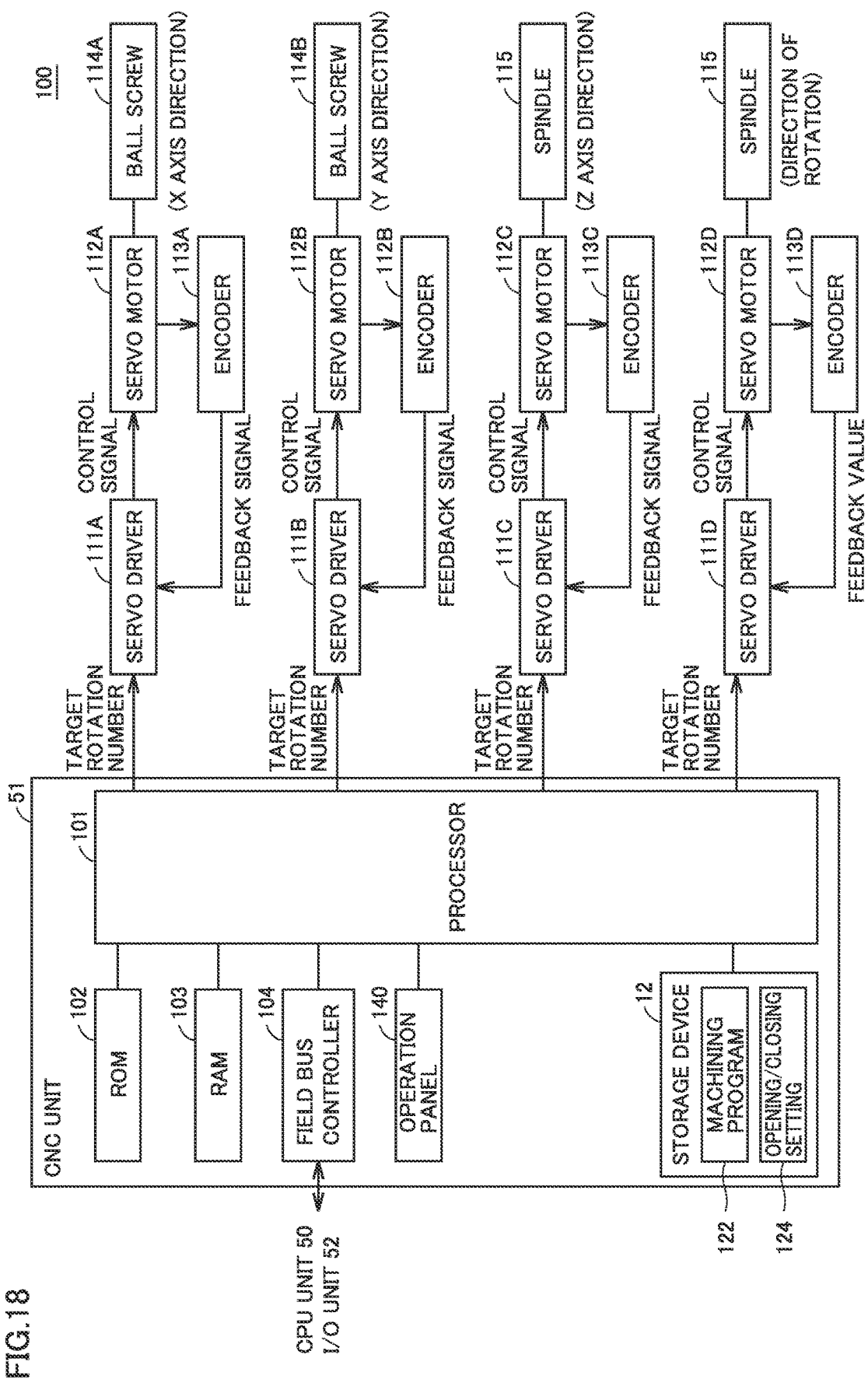
FIG. 18 is a view showing an example of a hardware configuration of the machine tool.

Next, a hardware configuration of machine tool 100 will be described with reference to FIG. 18. FIG. 18 is a view showing an example of a hardware configuration of machine tool 100.

Machine tool 100 includes CNC unit 51, servo drivers 111A to 111D, servo motors 112A to 112D, encoders 113A to 113D, ball screws 114A and 114B, and spindle 115. CNC unit 51 includes a processor 101, a ROM 102, a RAM 103, a communication interface 104, and operation panel 140.

Processor 101 is constituted by at least one integrated circuit. The integrated circuit is constituted by at least one CPU, at least one MPU, at least one ASIC, at least one FPGA, a combination thereof, or the like, for example.

Processor 101 controls an operation of CNC unit 51 by executing various programs such as machining program 122. Machining program 122 defines various instructions for implementing machining of a workpiece. Processor 101 reads machining program 122 from a storage device 120 to ROM 102, based on receiving an instruction to execute machining program 122. RAM 103 functions as a working memory, and temporarily stores various types of data necessary to execute machining program 122.

Communication interface 104 is an interface for connecting to a field network NW (see FIG. 6). CNC unit 51 exchanges data with various devices (for example, CPU unit 50, I/O unit 52, and the like) connected to field network NW via communication interface 104.

Operation panel 140 receives various operations for machine tool 100. Further, operation panel 140 includes display 142 to display various types of information. The display is a liquid crystal display, an organic EL display, or another display apparatus, for example.

CNC unit 51 controls servo drivers 111A to 111D according to machining program 122. Servo driver 111A moves table 116 described above connected to ball screw 114A in the X axis direction (see FIG. 2) according to a control command from CNC unit 51, to move table 116 to an arbitrary position in the X axis direction. Servo driver 111B moves table 116 connected to ball screw 114B in the Y axis direction (see FIG. 2) according to a control command from CNC unit 51, to move table 116 to an arbitrary position in the Y axis direction. Servo driver 111C moves spindle 115 in the Z axis direction (see FIG. 2) according to a control command from CNC unit 51, to move spindle 115 to an arbitrary position in the Z axis direction. Servo driver 111D controls the rotation speed of spindle 115 according to a control command from CNC unit 51.

Storage device 120 is a storage medium such as a hard disk or a flash memory, for example. Storage device 120 stores machining program 122 and the like. The location where machining program 122 is stored is not limited to storage device 120, and machining program 122 may be stored in a storage region (for example, a cache region or the like) of processor 101, ROM 102, RAM 103, an external device (for example, a server), or the like.

Machining program 122 may be provided to be incorporated into a portion of an arbitrary program, rather than being provided as a single program. In this case, various types of processing according to the present embodiment are implemented in cooperation with the arbitrary program. Such a program which does not include some modules does not deviate from the gist of machining program 122 according to the present embodiment. Further, the function provided by machining program 122 may be partly or entirely implemented by dedicated hardware. Further, CNC unit 51 may be configured in a form like a so-called cloud service in which at least one server performs a portion of processing of machining program 122.

<M. Flowchart in Teaching Mode>

Figure 19:
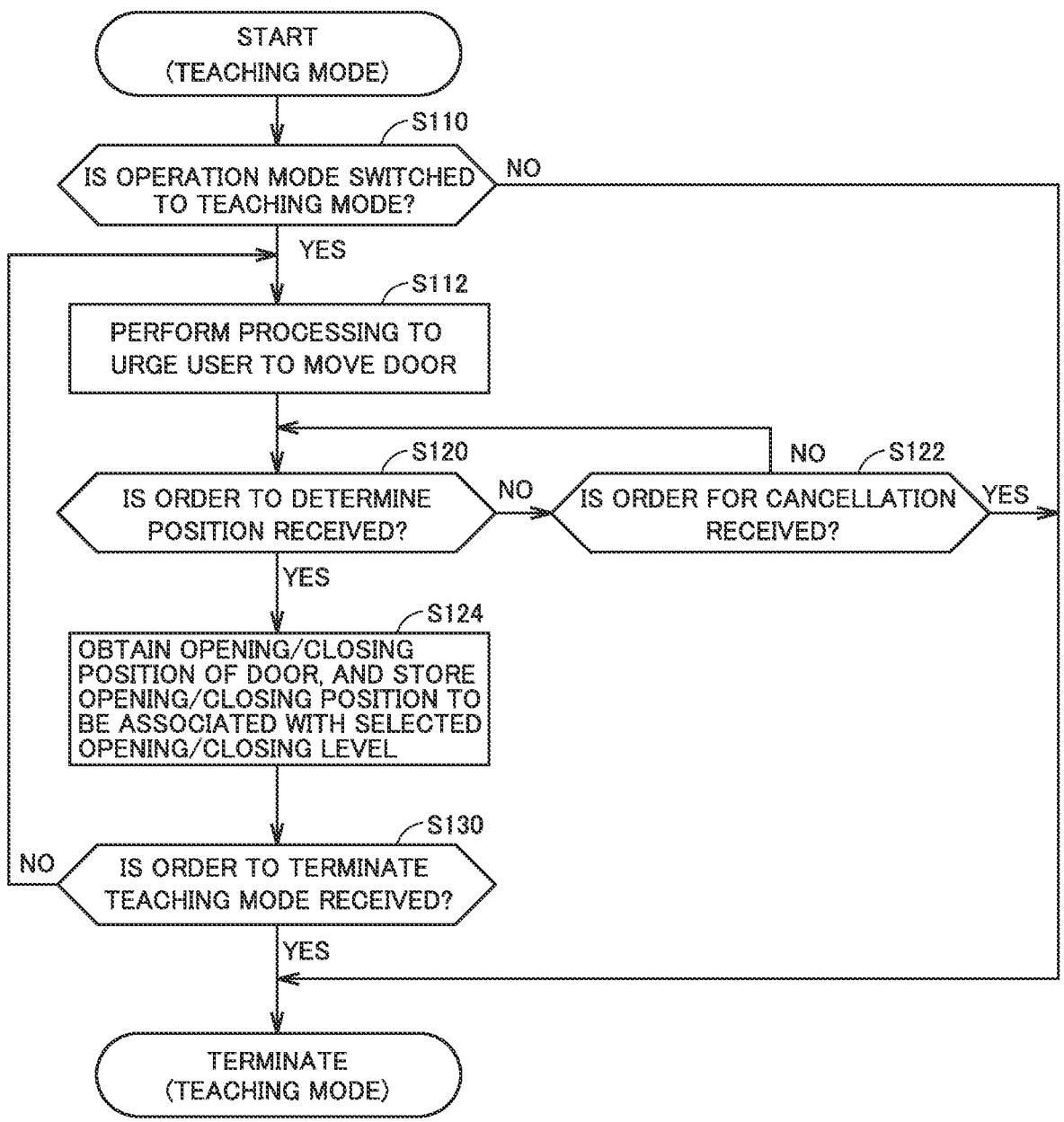
FIG. 19 is a flowchart showing a flow of the teaching processing.

A control flow during the teaching mode will be described with reference to FIG. 19. FIG. 19 is a flowchart showing a flow of the teaching processing. The processing shown in FIG. 19 is performed by control device 40 of machine tool 100, for example.

In step S110, control device 40 determines whether the operation mode of machine tool 100 is switched to the teaching mode by a user operation on operation panel 140. When control device 40 determines that the operation mode of machine tool 100 is switched to the teaching mode (YES in step S110), control device 40 switches the control to step S112. Otherwise (NO in step S110), control device 40 closes setting screen 143B to terminate the teaching processing shown in FIG. 19.

In step S112, control device 40 performs processing to urge the user to move door 136. As an example, control device 40 displays setting screen 143B described above (see FIG. 11) on display 142. Thereby, the user is urged by the display on setting screen 143B and manually moves door 136.

In step S120, control device 40 determines whether it receives an order to determine the position of door 136. As an example, control device 40 receives an order to determine the position of door 136 based on the user pressing "determine" button 147 on setting screen 143B. When control device 40 determines that it receives the order to determine the position of door 136 (YES in step S120), control device 40 switches the control to step S124. Otherwise (NO in step S120), control device 40 switches the control to step S122.

In step S122, control device 40 determines whether it receives an order for cancellation. As an example, control device 40 receives an order for cancellation based on the user pressing "cancel" button 146 on setting screen 143B. When control device 40 determines that it receives the order for cancellation (YES in step S122), control device 40 closes setting screen 143B to terminate the processing in FIG. 19. Otherwise (NO in step S122), control device 40 returns the control to step S120.

In step S124, control device 40 obtains a current opening/closing position of door 136 from detection unit 138 described above. Thereafter, control device 40 stores the obtained opening/closing position to be associated with an opening/closing level selected on setting screen 143B, in opening/closing setting 124 described above (see FIG. 8).

In step S130, control device 40 determines whether it receives an order to terminate the teaching mode. The order to terminate the teaching mode is given based on the user pressing "cancel" button 146 on setting screen 143B, for example. When control device 40 determines that it receives the order to terminate the teaching mode (YES in step S130), control device 40 closes setting screen 143B to terminate the processing in FIG. 19. Otherwise (NO in step S130), control device 40 returns the control to step S112.

It should be noted that, although FIG. 19 describes the flowchart of the manual teaching mode in which the user manually sets an opening/closing position of door 136, the user may automatically set the opening/closing position of door 136. In this case, in step S112, setting screen 143C described above (see FIG. 13) is displayed. More specifically, in step S112, when "manual" button 160 on setting screen 143C is pressed, control device 40 urges the user to manually move door 136. Alternatively, when "automatic" button 161 on setting screen 143C is pressed, control device 40 urges the user to automatically move door 136 (through driving by a motor).

<N. Flowchart in Automatic Opening/Closing Mode>

Figure 20:
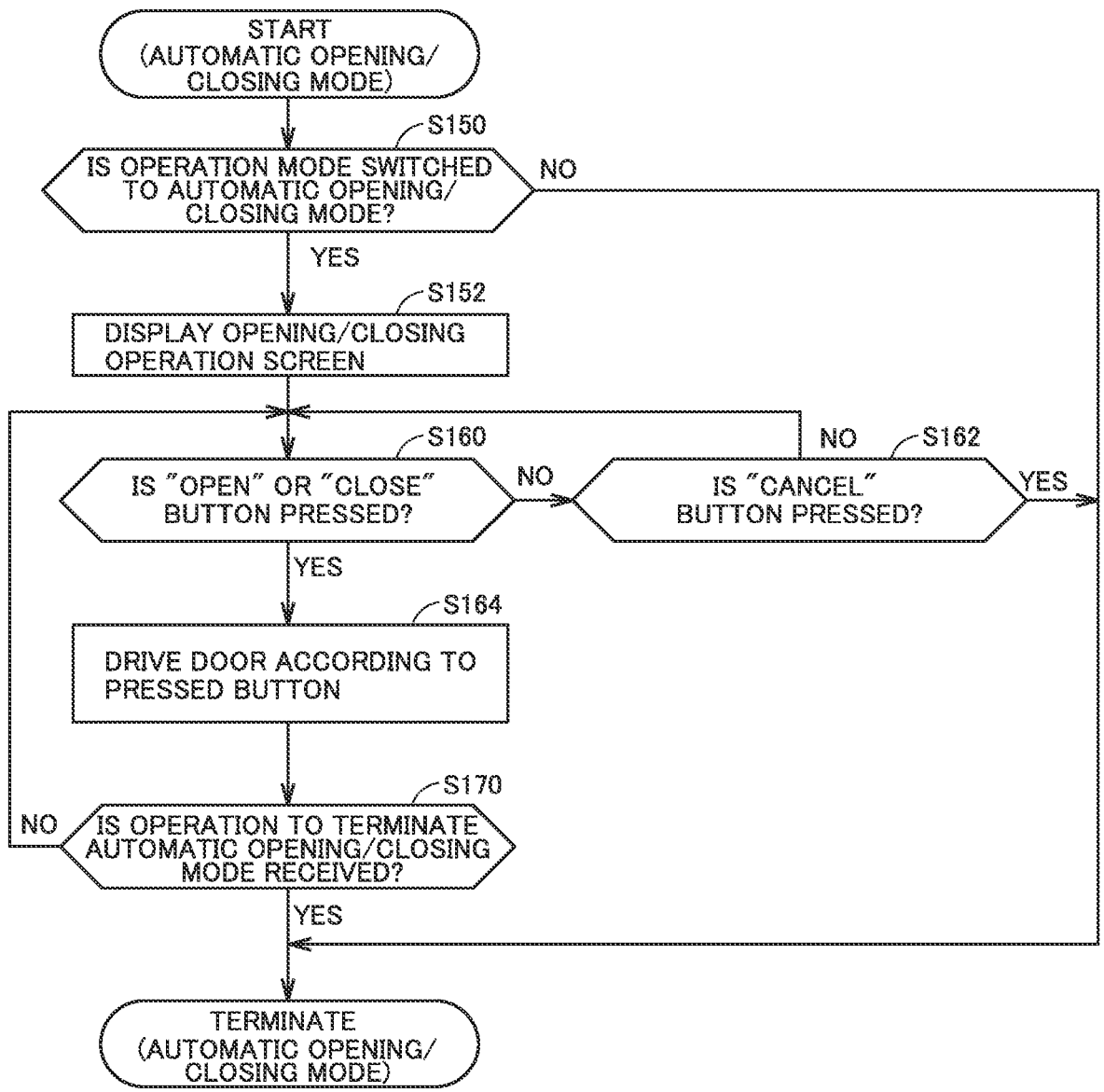
FIG. 20 is a flowchart showing a flow of automatic opening/closing processing for the door.

A control flow during the automatic opening/closing mode will be described with reference to FIG. 20. FIG. 20 is a flowchart showing a flow of automatic opening/closing processing for door 136. The processing shown in FIG. 20 is performed by control device 40 of machine tool 100, for example.

In step S150, control device 40 determines whether the operation mode of machine tool 100 is switched to the automatic opening/closing mode by a user operation on operation panel 140. When control device 40 determines that the operation mode of machine tool 100 is switched to the automatic opening/closing mode (YES in step S150), control device 40 switches the control to step S152. Otherwise (NO in step S150), control device 40 closes opening/closing operation screen 144 to terminate the processing in FIG. 20.

In step S152, control device 40 displays opening/closing operation screen 144 described above (see FIG. 9) on display 142.

In step S160, control device 40 determines whether an "open" or "close" button displayed on opening/closing operation screen 144 is pressed. When control device 40 determines that the "open" or "close" button displayed on opening/closing operation screen 144 is pressed (YES in step S160), control device 40 switches the control to step S164. Otherwise (NO in step S160), control device 40 switches the control to step S162.

In step S162, control device 40 determines whether "cancel" button 154 displayed on opening/closing operation screen 144 is pressed. When control device 40 determines that "cancel" button 154 is pressed (YES in step S162), control device 40 closes opening/closing operation screen 144 to terminate the processing in FIG. 20. Otherwise (NO in step S162), control device 40 returns the control to step S160.

In step S164, control device 40 drives door 136 according to the type of the "open" or "close" button pressed in step S160. As an example, when one of "open" buttons 152A to 152C displayed on opening/closing operation screen 144 is pressed, control device 40 specifies an opening/closing level corresponding to the pressed "open" button. Then, control device 40 obtains an opening/closing position corresponding to the specified opening/closing level by referring to opening/closing setting 124 described above (see FIG. 8). Thereafter, control device 40 controls drive mechanism 137 to drive door 136 to the obtained opening/closing position. On the other hand, when "close" button 153 displayed on opening/closing operation screen 144 is pressed, control device 40 controls drive mechanism 137 to drive door 136 to a predetermined closing position.

In step S170, control device 40 determines whether it receives an order to terminate the automatic opening/closing mode. The order to terminate the automatic opening/closing mode is given based on the user pressing "cancel" button 154 on opening/closing operation screen 144. When control device 40 determines that it receives the order to terminate the automatic opening/closing mode (YES in step S170), control device 40 closes opening/closing operation screen 144 to terminate the processing in FIG. 20. Otherwise (NO in step S170), control device 40 returns the control to step S160.

<O. Conclusion>

In this manner, machine tool 100 has the teaching function by which an opening/closing position of door 136 can be manually designated. Since the user can set the opening/closing position by actually moving door 136, the user can set the opening/closing position while visually checking the degree of opening/closing. Further, since the user can set the opening/closing position merely by moving door 136, the user does not have to rewrite a program or opening/closing setting, and can easily set the opening/closing position of door 136.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

40: control device; 50: CPU unit; 51: CNC unit; 52: I/O unit; 61, 111A to 111D: servo driver; 62, 112A to 112D: servo motor; 71, 101: processor; 72, 102: ROM; 73, 103: RAM; 74, 104: communication interface; 75: field bus controller; 79: internal bus; 90, 120: storage device; 92: control program; 96: database; 100: machine tool; 113A to 113D: encoder; 114A, 114B: ball screw; 115: spindle; 116: table; 122: machining program; 124: opening/closing setting; 131: cover; 132: opening; 136: door; 137: drive mechanism; 138: detection unit; 139: handle; 140: operation panel; 142: display; 143, 143A to 143D: setting screen; 144: opening/closing operation screen; 145: message; 146, 154: "cancel" button; 147: "determine" button; 150: setting field; 152A to 152C, 162: "open" button; 153, 163: "close" button; 156: "add" button; 157: "delete" button; 160: "manual" button; 161: "automatic" button; 165: opening/closing position display region; 170: "enable teaching" button; 171: "open at low speed" button; 172: "close at low speed" button; 173: "perform teaching" button; 178: "unlock" button; 179: "designate door" button; 179A to 179D: button.

The invention claimed is:

1. A machine tool comprising:
a cover having an opening and defining a machining area for a workpiece;
a door for covering the opening;
a drive mechanism that drives the door to change a degree of the opening;
a detection unit for detecting an actual position of the door;
an operation panel for receiving an operation for the machine tool; and
a control device for controlling the machine tool, wherein the control device performs
processing to control the drive mechanism such that the door is opened, based on the operation panel receiving a first opening operation for the door,
processing to obtain the actual position from the detection unit and store the obtained actual position as an opening position of the door, based on the operation panel receiving an operation to determine a position of the door, and
processing to control the drive mechanism such that the door is located at the opening position, based on the operation panel receiving a second opening operation for the door, and an opening speed of the door during the first opening operation is slower than an opening speed of the door during the second opening operation.

2. The machine tool according to claim 1, wherein
in the processing to store, the operation panel sequentially receives the operation to determine the position for each opening level, and the opening position is stored for each opening level, and
the control device performs processing to control the drive mechanism such that the door is driven to an opening position corresponding to an inputted opening level, based on the operation panel receiving an input of the opening level as the second opening operation.

3. The machine tool according to claim 2, wherein
the machine tool further comprises a display unit,
the control device performs processing to display a setting screen for the opening position on the display unit,
the setting screen includes
display of the opening levels,
a first receiving portion that receives an order to increase a number of the opening levels displayed on the setting screen by a predetermined number, and
a second receiving portion that receives an order to decrease the number of the opening levels displayed on the setting screen by the predetermined number, and
the processing to store includes processing to store the opening position for each of the opening levels displayed on the setting screen.

4. The machine tool according to claim 1, wherein
the drive mechanism includes a motor for driving the door, and
the door is provided with a handle.

5. The machine tool according to claim 3, wherein the control device performs processing to display a message for urging a user to move the door, on the setting screen.

6. A control method for a machine tool,
the machine tool including:
a cover having an opening and defining a machining area for a workpiece;
a door for covering the opening;
a drive mechanism that drives the door to change a degree of the opening;
a detection unit for detecting an actual position of the door; and
an operation panel for receiving an operation for the machine tool,
the control method comprising:
controlling the drive mechanism such that the door is opened, based on the operation panel receiving a first opening operation for the door,
obtaining the actual position from the detection unit and storing the obtained actual position as an opening position of the door, based on the operation panel receiving an operation to determine a position of the door, and
controlling the drive mechanism such that the door is located at the opening position, based on the operation panel receiving a second opening operation for the door, wherein
an opening speed of the door during the first opening operation is slower than an opening speed of the door during the second opening operation.

7. A non-transitory computer readable storage medium storing a control program for execution by a machine tool, the machine tool including:

a cover having an opening and defining a machining area for a workpiece;

a door for covering the opening;

a drive mechanism that drives the door to change a degree of the opening;

a detection unit for detecting an actual position of the door; and an operation panel for receiving an operation for the machine tool, the control program causing the machine tool to perform:

controlling the drive mechanism such that the door is opened, based on the operation panel receiving a first opening operation for the door, obtaining the actual position from the detection unit and storing the obtained actual position as an opening position of the door, based on the operation panel receiving an operation to determine a position of the door, and controlling the drive mechanism such that the door is located at the opening position, based on the operation panel receiving a second opening operation for the door, wherein an opening speed of the door during the first opening operation is slower than an opening speed of the door during the second opening operation.

* * * * *